United States Patent
Iwanaga et al.

(10) Patent No.: US 6,940,239 B2
(45) Date of Patent: *Sep. 6, 2005

(54) MOTOR DRIVING DEVICE AND MOTOR DRIVING METHOD

(75) Inventors: Taishi Iwanaga, Kyoto (JP); Yasunori Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 28 days.

This patent is subject to a terminal disclaimer.

(21) Appl. No.: 10/307,986

(22) Filed: Dec. 3, 2002

(65) Prior Publication Data

US 2003/0102832 A1 Jun. 5, 2003

(30) Foreign Application Priority Data

Dec. 4, 2001 (JP) .......................................... 2001-370515

(51) Int. Cl.⁷ .............................. H02P 5/00; H02P 7/00
(52) U.S. Cl. ...................... 318/268; 318/138; 318/254; 318/439; 318/599; 318/432; 318/434; 318/700
(58) Field of Search ................................ 318/268, 138, 318/439, 430–434, 254, 700, 727, 599, 800, 811

(56) References Cited

U.S. PATENT DOCUMENTS

| | | | | |
|---|---|---|---|---|
| 4,928,043 | A | * 5/1990 | Plunkett | 318/254 |
| 5,517,095 | A | * 5/1996 | Carobolante et al. | 318/254 |
| 5,949,203 | A | * 9/1999 | Buthker | 318/254 |
| 6,020,715 | A | * 2/2000 | Yasohara et al. | 318/808 |
| 6,043,624 | A | * 3/2000 | Masaki et al. | 318/723 |
| 6,111,372 | A | * 8/2000 | Nishimura | 318/254 |
| 6,329,781 | B1 | * 12/2001 | Matsui et al. | 318/717 |
| 6,377,008 | B1 | * 4/2002 | Hirata | 318/459 |
| 6,528,968 | B2 | * 3/2003 | Seima et al. | 318/811 |
| 6,650,084 | B2 | * 11/2003 | Fujioka et al. | 318/705 |
| 6,674,258 | B2 | * 1/2004 | Sakai et al. | 318/439 |
| 6,710,569 | B2 | * 3/2004 | Iwanaga et al. | 318/599 |

FOREIGN PATENT DOCUMENTS

| | | | | |
|---|---|---|---|---|
| EP | 1318595 A2 | * 3/2004 | | H02P/6/08 |
| JP | 08-19284 | * 1/1995 | | H02P/6/02 |
| JP | 10-59262 | * 3/1998 | | B62M/23/02 |
| JP | 11-235079 | 8/1999 | | |
| JP | 2000-125590 | * 4/2000 | | H02P/6/02 |
| JP | 2001 211680 | 8/2001 | | |
| JP | 2003-174789 | * 3/2003 | | H02P/6/02 |
| WO | WO 01/31772 A1 | 5/2001 | | |
| WO | WO 01/37419 | 5/2001 | | |

* cited by examiner

*Primary Examiner*—David Martin
*Assistant Examiner*—Tyrone Smith
(74) *Attorney, Agent, or Firm*—McDermott Will & Emery LLP

(57) ABSTRACT

In a PWM-controlled motor driving device, a phase current is prevented from undergoing an abrupt transition at phase current switching points, thereby reducing vibrations and noise of the motor. A PWM control section produces two independent PWM control pulse signals P1 and P2. Two energized phases, which are determined by an energization switching section, are energized with PWM control in parallel according to the PWM control pulse signals P1 and P2. A comparison section compares a current detection signal DS, which indicates the level of the current flowing through a motor coil, with various torque command signals TQ1, TQ2 and TQ3, which are produced by a torque command signal generation section. A masking section masks comparison results CR1 and CR2 as necessary. Thus, an ON period of the PWM control pulse signal P1 and that of the PWM control pulse signal P2 are determined. In this way, phase current switching can be done smoothly with any torque from a low torque to a high torque, thereby preventing an abrupt phase current transition.

22 Claims, 22 Drawing Sheets

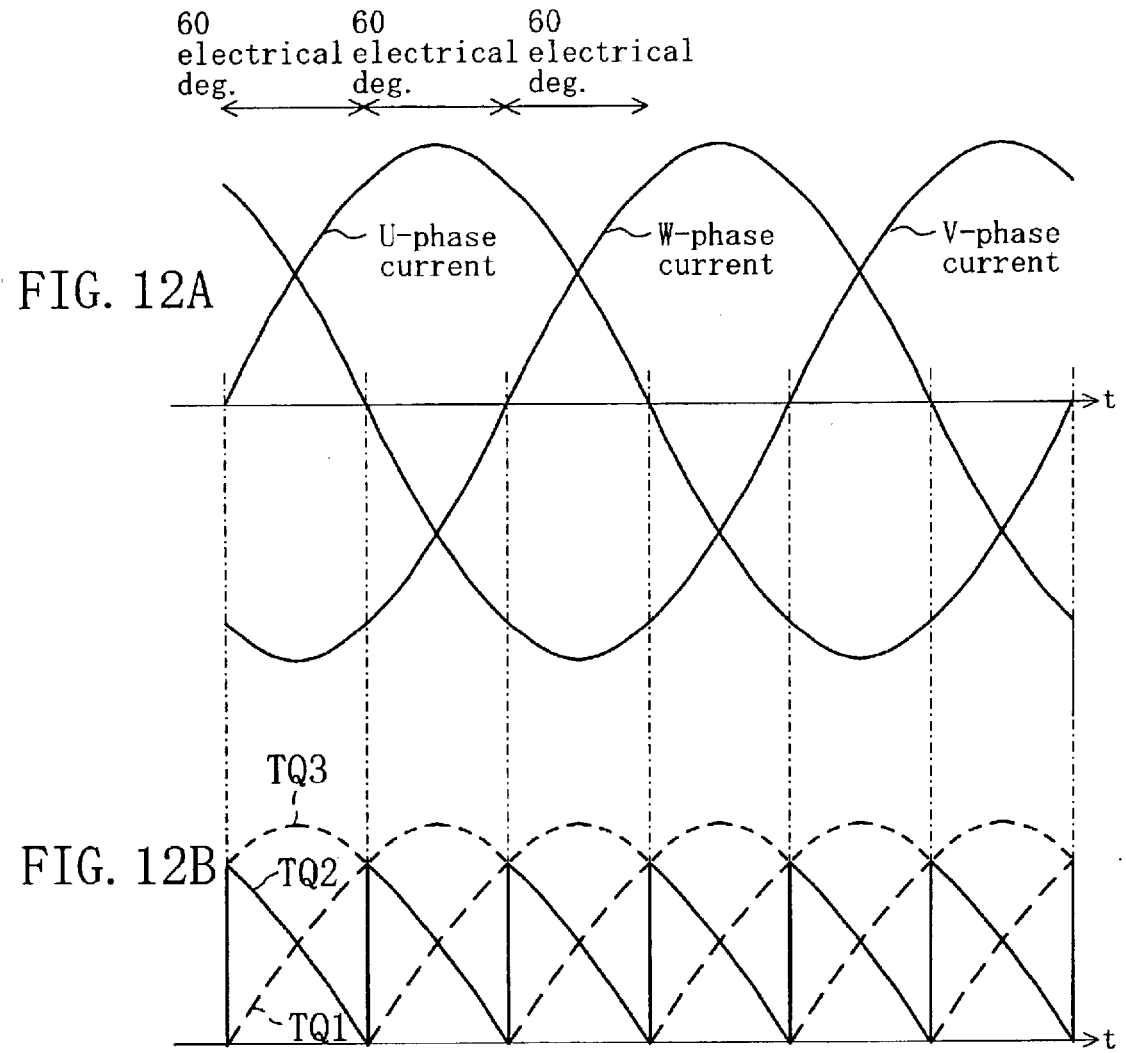

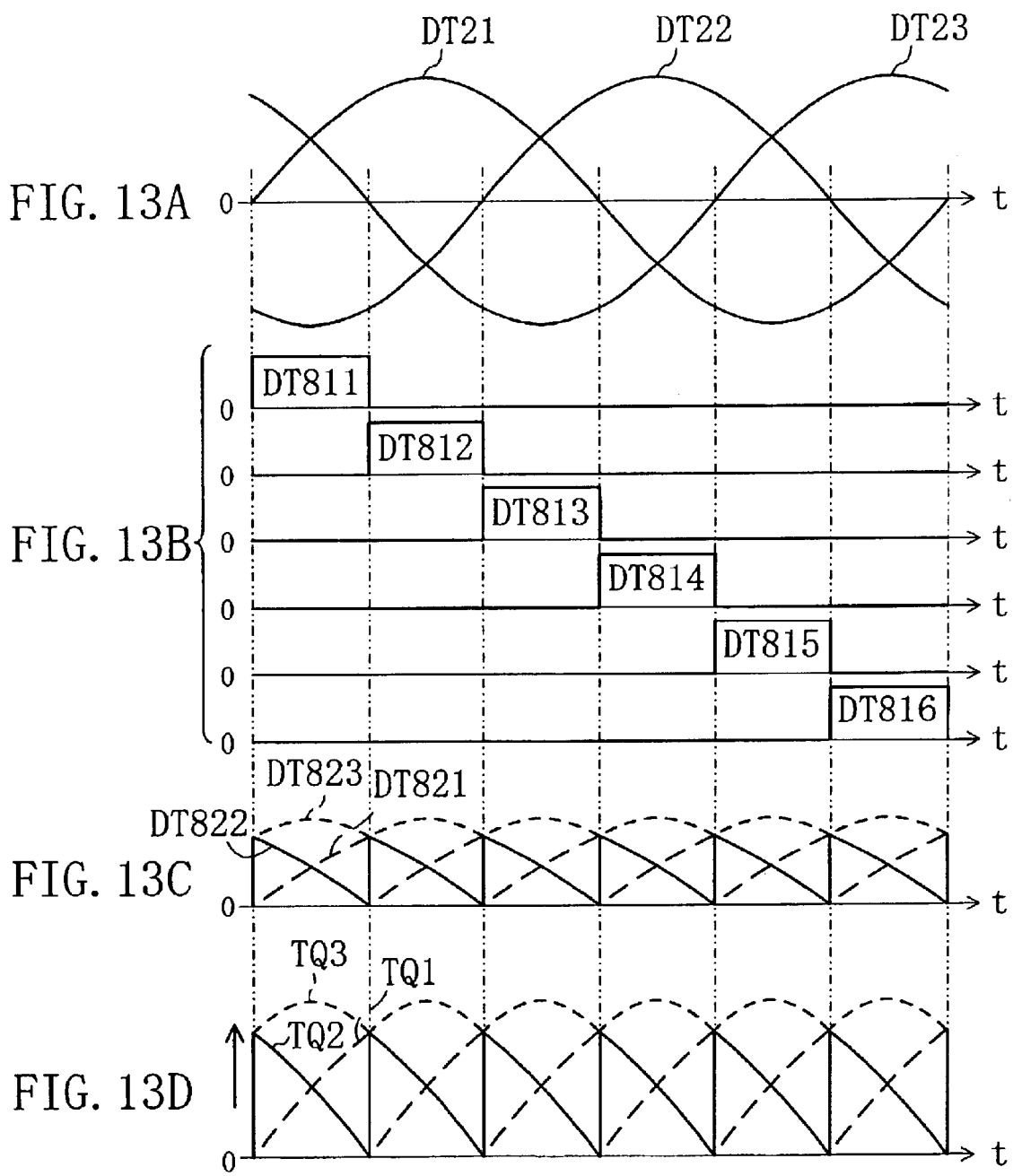

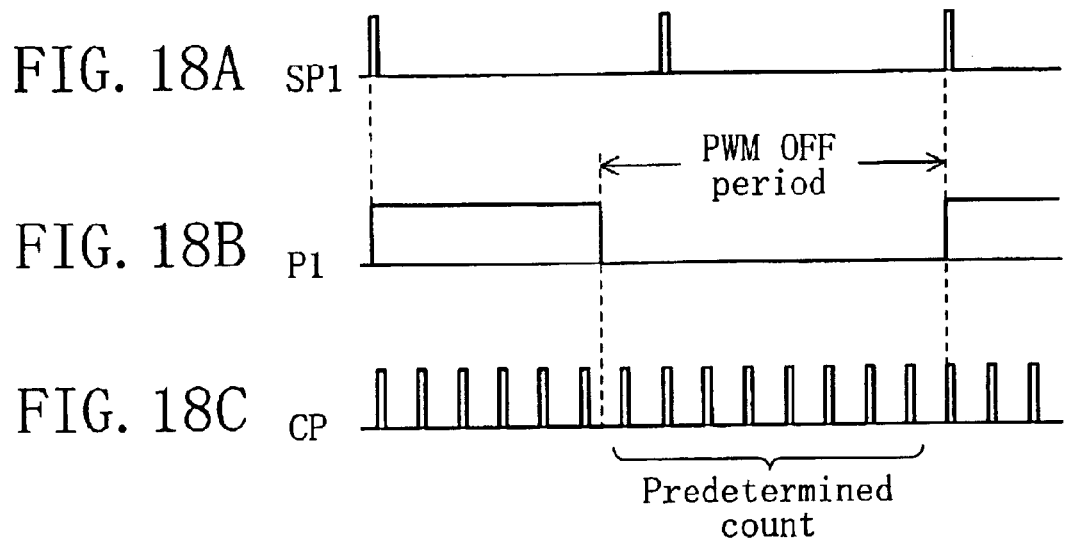
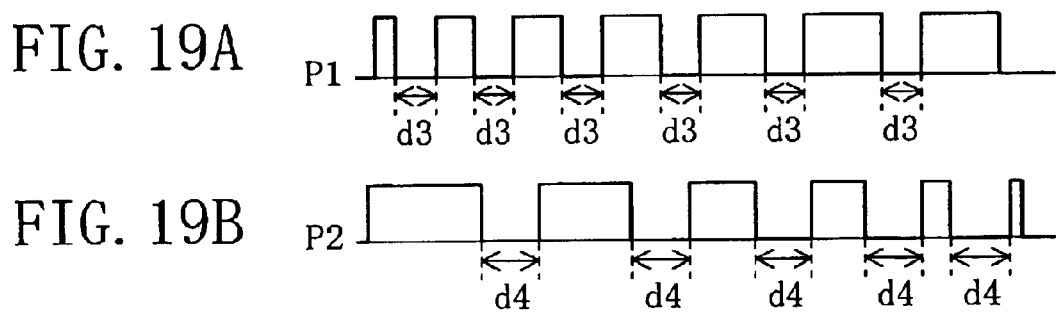

MOTOR DRIVING DEVICE AND MOTOR DRIVING METHOD

BACKGROUND OF THE INVENTION

The present invention relates to a technique for driving a motor, and more particularly to a technique for driving a PWM-controlled motor.

FIG. 22 illustrates a configuration of a conventional motor driving device for driving a three-phase motor (having U phase, V phase and W phase) by energizing the motor coils with PWM control. The conventional motor driving device includes a power supply 1 for driving the motor, a Hall signal processing section 2, an energization switching section 3, a level shift section 4, an oscillation section 5, a comparison section 6, a PWM control section 7, three half-bridge circuits connected in parallel to one another, a current detection resistor R, and an amplifier A for amplifying a voltage across the current detection resistor R.

The Hall signal processing section 2 receives Hall signals from Hall elements to produce logical signals that indicate the rotor position. The energization switching section 3 receives the logical signals to determine phases to be energized. FIG. 23A to FIG. 23C each illustrate a phase current to be applied to an energized phase, which is determined by the energization switching section 3, wherein FIG. 23A illustrates a U-phase current, FIG. 23B illustrates a V-phase current, and FIG. 23C illustrates a W-phase current. FIG. 23D illustrates a torque command signal TQ for determining the current level of the phase current. In FIG. 23A, FIG. 23B and FIG. 23C, a portion above the time axis represents the application of the source current, and a portion below the time axis represents the application of the sink current. Note that in the example shown in FIG. 23A to FIG. 23D, since the level of the torque command signal TQ is constant, each phase current flows as a source current or a sink current at a constant current level.

In the conventional motor driving device, a motor coil is energized with a source current (or a sink current) at a current level according to the torque command signal TQ during a period of 120 electrical degrees. Then, the motor coil is not energized, and thus the current level is zero, during the following period of 60 electrical degrees. Then, the motor coil is energized similarly but with a sink current (or a source current). Three phase currents each having such a rectangular waveform are applied while being shifted from one another by 120 electrical degrees. As a result, at any given time, a total of two phases are being energized, one with a source current and the other with a sink current, while the remaining phase being not energized. Thus, in the conventional motor driving device, the energization switching section 3 determines a total of two phases to be the energized phases, one for the source current side and the other for the sink current side. Moreover, the energized phase determination is performed for every 60 electrical degrees.

The PWM control section 7 performs PWM control using a PWM control signal P for each of the energized phases determined by the energization switching section 3. When the PWM control signal P is turned ON, a transistor of a half-bridge circuit is latched ON through the energization switching section 3 and the level shift section 4, whereby a current flows from the power supply 1 to a motor coil. Then, when the PWM control signal P is turned OFF, the transistor of the half-bridge circuit is latched OFF, whereby the current flow from the power supply 1 is stopped. It is only required to control, with the PWM control signal P, either one of the source-current-side transistor and the sink-current-side transistor, and the other transistor that is not PWM-controlled can be fixed to ON. Herein, it is assumed that the source-current-side transistor is PWM-controlled, while the sink-current-side transistor is fixed to ON. Therefore, in FIG. 23A, FIG. 23B and FIG. 23C, each hatched portion is where PWM control is performed.

In the conventional motor driving device, there is an abrupt transition of the phase current at each phase current switching point, as illustrated in FIG. 23A to FIG. 23C. Such an abrupt phase current transition causes vibrations in the motor, thereby causing the motor to give noise.

SUMMARY OF THE INVENTION

The present invention has been made in view of the above, and has an object to provide a technique for driving a motor with PWM control, with which it is possible to realize switching of energized phases without causing an abrupt phase current transition, thereby suppressing vibrations of the motor and thus reducing noise from the motor.

In order to achieve the object set forth above, the present invention provides a motor driving device for driving a motor by energizing motor coils with PWM control, the motor driving device including: an energization switching section for determining a first energized phase and a second energized phase to be PWM-controlled, the determination being made at a predetermined cycle; a torque command signal generation section that receives an original torque command signal for producing a first torque command signal and a second torque command signal each having an amplitude according to the original torque command signal; a comparison section that receives the first and second torque command signals and a current detection signal, which is obtained by detecting a current being supplied to the motor, for comparing the current detection signal with the first and second torque command signals to output a first comparison result and a second comparison result, respectively; an oscillation section for producing a first set pulse signal and a second set pulse signal; and a PWM control section that receives the first and second set pulse signals and the first and second comparison results for producing a first PWM control signal according to the first set pulse signal and the first comparison result and producing a second PWM control signal according to the second set pulse signal and the second comparison result, wherein the first and second energized phases, which are determined by the energization switching section, are energized with PWM control in parallel according respectively to the first and second PWM control signals, which are produced by the PWM control section.

With the motor driving device of the present invention, the first and second energized phases, which are determined by the energization switching section, can be energized with PWM control in parallel according to the current levels of the first and second torque command signals, which are two different torque command signals produced by the torque command signal generation section. In this way, phase current switching can be done smoothly.

It is preferred that: the torque command signal generation section produces a third torque command signal, which is obtained by synthesizing the first and second torque command signals together; and the comparison section compares the third torque command signal with the current detection signal to output a third comparison result, with the motor driving device further including a masking section that receives the first and second PWM control signals and the first, second and third comparison results for selectively masking or not masking the first and second comparison results according to the first and second PWM control signals and the third comparison result.

In this way, for example, when two phases are simultaneously energized with PWM control, with the motor being controlled with a high torque, PWM control can be performed based on the levels of the currents applied to the two phases.

It is preferred that the masking section masks the first and second comparison results during a period in which the first and second PWM control signals are both ON.

It is preferred that upon detecting, from the third comparison result, that a level of the current detection signal has reached that of the third torque command signal during a period in which the first and second PWM control signals are both ON, the masking section unmasks one of the first and second comparison results while not unmasking the other comparison result for a predetermined period.

It is preferred that: during the predetermined cycle, the first torque command signal keeps increasing, whereas the second torque command signal keeps decreasing; and upon said detection, the masking section unmasks the second comparison result.

It is preferred that: during the predetermined cycle, the first torque command signal keeps increasing, whereas the second torque command signal keeps decreasing; and upon said detection, the masking section unmasks the first comparison result if said detection occurs in a first half of the predetermined cycle while unmasking the second comparison result if said detection occurs in a latter half of the predetermined cycle.

In one embodiment of the present invention, the comparison section includes three comparators for comparing the current detection signal with the first, second and third torque command signals, respectively.

In one embodiment of the present invention: the motor is a three-phase motor; and the energization switching section switches the first and second energized phases for every 60 electrical degrees in a cycle of a phase current applied to the motor coil of each phase in the motor.

In one embodiment of the present invention: the motor is a four-phase motor; and the energization switching section switches the first and second energized phases for every 90 electrical degrees in a cycle of a phase current applied to the motor coil of each phase in the motor.

It is preferred that the torque command signal generation section receives a rotor detection signal for producing the first and second torque command signals each having a cycle that corresponds to a period of said electric angle in a cycle of the rotor detection signal.

It is preferred that the torque command signal generation section receives a rotor detection signal for producing the first and second torque command signals by using divided signals that are obtained by dividing the rotor detection signal so that each divided signal has a period corresponding to said electric angle.

In one embodiment of the present invention, the oscillation section produces the first and second set pulse signals whose cycles are independent of each other.

In one embodiment of the present invention, the oscillation section produces the first and second set pulse signals so that a phase difference therebetween changes according to a rotational speed of the motor.

In one embodiment of the present invention, the PWM control section turns ON the first PWM control signal according to the first set pulse signal and turns ON the second PWM control signal according to the second set pulse signal.

In one embodiment of the present invention, the PWM control section turns OFF the first PWM control signal upon detecting, from the first comparison result, that a level of the current detection signal has reached that of the first torque command signal, and turns OFF the second PWM control signal upon detecting, from the second comparison result, that a level of the current detection signal has reached that of the second torque command signal.

In one embodiment of the present invention, the PWM control section turns ON the first PWM control signal after passage of a predetermined period from a point in time when the first PWM control signal is turned OFF, and turns ON the second PWM control signal after passage of a predetermined period from a point in time when the second PWM control signal is turned OFF.

In order to achieve the object set forth above, the present invention provides a motor driving method for driving a motor by energizing motor coils with PWM control, the motor driving method including: an energization switching step of determining a first energized phase and a second energized phase to be PWM-controlled, the determination being made at a predetermined cycle; a torque command signal generation step of producing a first torque command signal and a second torque command signal each having an amplitude according to a given original torque command signal; a comparison step of comparing a current detection signal, which is obtained by detecting a current being supplied to the motor, with each of the first and second torque command signals; and a PWM control step of producing a first PWM control signal and a second PWM control signal according to a first set pulse signal, a second set pulse signal and comparison results from the comparison step, wherein the first and second energized phases, which are determined by the energization switching step, are energized with PWM control in parallel according respectively to the first and second PWM control signals, which are produced by the PWM control step.

With the motor driving method of the present invention, the first and second energized phases, which are determined by the energization switching step, can be energized with PWM control in parallel according to the current levels of the first and second torque command signals, which are two different torque command signals produced by the torque command signal generation step. In this way, phase current switching can be done smoothly.

It is preferred that: the torque command signal generation step produces a third torque command signal, which is obtained by synthesizing the first and second torque command signals together; and the comparison step compares the third torque command signal with the current detection signal, with the motor driving method further including a masking step of selectively masking or not masking the comparison results based on the first and second PWM control signals and the comparison result from the comparison step.

In this way, for example, when two phases are simultaneously energized with PWM control, with the motor being controlled with a high torque, PWM control can be performed based on the levels of the currents applied to the two phases.

In one embodiment of the present invention: the motor is a three-phase motor; and the energization switching step switches the first and second energized phases for every 60 electrical degrees in a cycle of a phase current applied to the motor coil of each phase in the motor.

In one embodiment of the present invention: the motor is a four-phase motor; and the energization switching step switches the first and second energized phases for every 90 electrical degrees in a cycle of a phase current applied to the motor coil of each phase in the motor.

BRIEF DESCRIPTION OF THE DRAWINGS

FIG. 12A and FIG. 12B are diagrams illustrating phase currents and various torque command signals used in the motor driving device according to the second embodiment of the present invention.

FIG. 13A to FIG. 13D are timing charts illustrating the production of the various torque command signals by the torque command signal generation section of FIG. 3 according to the second embodiment of the present invention.

FIG. 18A to FIG. 18C are diagrams illustrating a set pulse signal, a PWM control signal and a count pulse signal used in the motor driving device according to the fifth embodiment of the present invention.

FIG. 19A and FIG. 19B are diagrams illustrating PWM control signals used in the motor driving device according to the fifth embodiment of the present invention.

DESCRIPTION OF THE PREFERRED EMBODIMENTS

Preferred embodiments of the present invention will now be described with reference to the drawings.

First Embodiment

Figure 1:
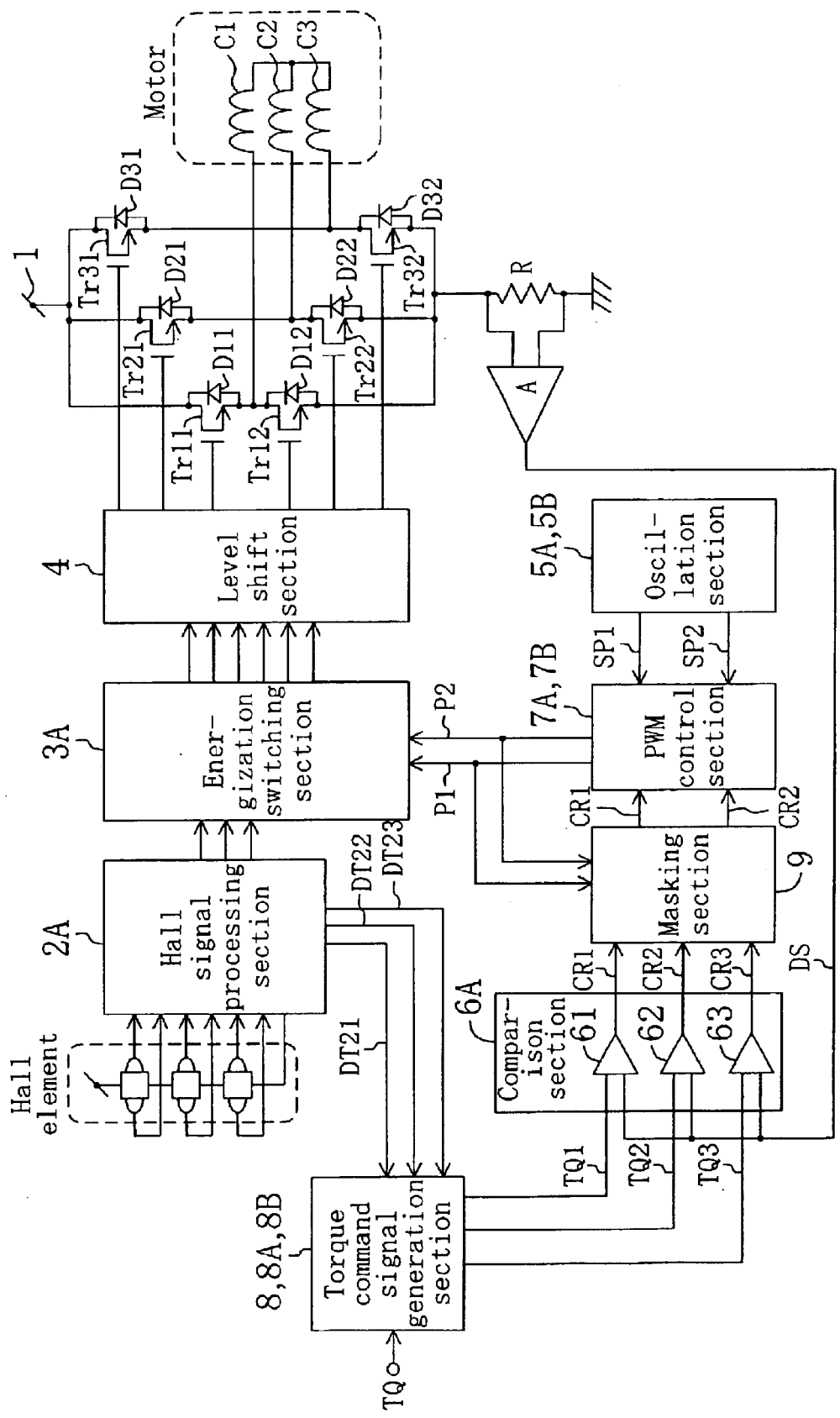
FIG. 1 is a diagram illustrating a configuration of a motor driving device according to first to fifth embodiments of the present invention.

FIG. 1 illustrates a configuration of a motor driving device according to the first embodiment of the present invention. The motor driving device of the present embodiment drives a three-phase motor (having U phase, V phase and W phase) by energizing the motor coils with PWM control. The motor driving device includes a power supply 1 for driving the motor, a Hall signal processing section 2A, an energization switching section 3A, a level shift section 4, an oscillation section 5A, a comparison section 6A, a PWM control section 7A, a torque command signal generation section 8, a masking section 9, three half-bridge circuits connected in parallel to one another, a current detection resistor R, and an amplifier A for amplifying a voltage across the current detection resistor R.

The half-bridge circuit for controlling the energization of a U-phase motor coil C1 includes a transistor Tr11 for controlling the application of the source current and a transistor Tr12 for controlling the application of the sink current. The half-bridge circuit for controlling the energization of a V-phase motor coil C2 includes a transistor Tr21 for controlling the application of the source current and a transistor Tr22 for controlling the application of the sink current. Similarly, the half-bridge circuit for controlling the energization of a W-phase motor coil C3 includes a transistor Tr31 for controlling the application of the source current and a transistor Tr32 for controlling the application of the sink current.

Diodes D11 and D12 are connected between the drain and the source of the transistors Tr11 and Tr12, respectively, each diode being connected in a direction that is opposite to the direction in which a current flows in response to an applied gate voltage. Diodes D21 and D22 are connected between the drain and the source of the transistors Tr21 and Tr22, respectively, each diode being connected in a direction that is opposite to the direction in which a current flows in response to an applied gate voltage. Similarly, diodes D31 and D32 are connected between the drain and the source of the transistors Tr31 and Tr32, respectively, each diode being connected in a direction that is opposite to the direction in which a current flows in response to an applied gate voltage.

Figure 2:
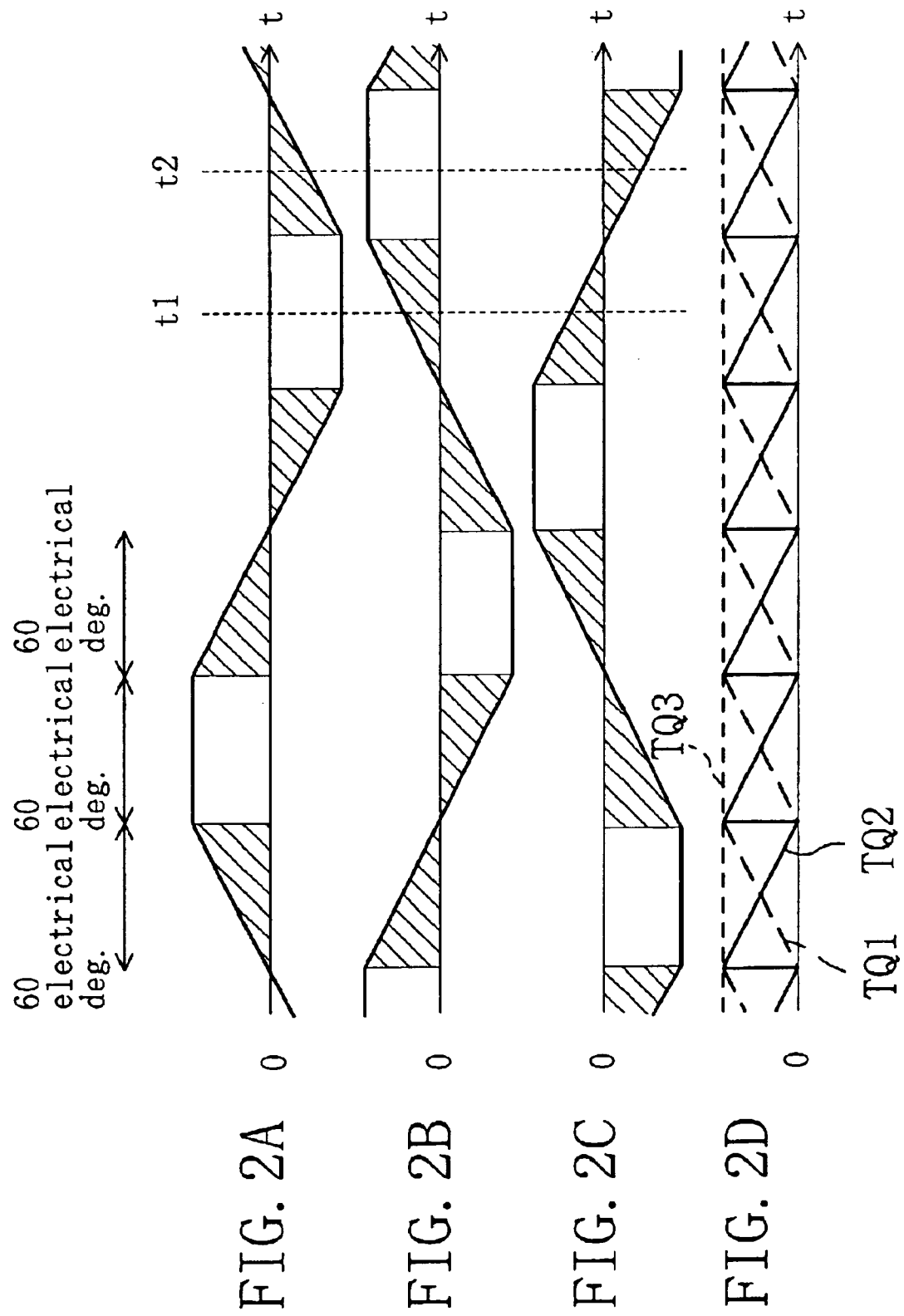
FIG. 2A to FIG. 2D are diagrams illustrating phase currents and various torque command signals used in the motor driving device according to the first, fourth and fifth embodiments of the present invention.

The Hall signal processing section 2A receives Hall signals from Hall elements to produce logical signals that indicate the rotor position. The energization switching section 3A receives the logical signals to determine phases to be energized. FIG. 2A to FIG. 2C each illustrate a phase current to be applied to an energized phase, which is determined by the energization switching section 3A, wherein FIG. 2A illustrates a U-phase current, FIG. 2B illustrates a V-phase current, and FIG. 2C illustrates a W-phase current. FIG. 2D illustrates various torque command signals each for determining the current level of the phase current. In FIG. 2A, FIG. 2B and FIG. 2C, a portion above the time axis represents the application of the source current, and a portion below the time axis represents the application of the sink current.

FIG. 2D illustrates an increasing torque command signal TQ1 (corresponding to the "first torque command signal" of the present invention), a decreasing torque command signal TQ2 (corresponding to the "second torque command signal" of the present invention), and a total torque command signal TQ3 (corresponding to the "third torque command signal" of the present invention). Each of the torque command signals TQ1, TQ2 and TQ3 is a signal whose cycle has a period that corresponds to 60 electrical degrees in the cycle of the phase current, and is produced by the torque command signal generation section 8. During a period of 60 electrical degrees, the increasing torque command signal TQ1 keeps increasing, whereas the decreasing torque command signal TQ2 keeps decreasing. The total torque command signal TQ3 is obtained by synthesizing the increasing torque command signal TQ1 with the decreasing torque command signal TQ2.

In the motor driving device of the present embodiment, each of the motor coils C1, C2 and C3 is energized with a source current (or a sink current) so that the current level increases according to the increasing torque command signal TQ1 during a period of 60 electrical degrees. In the following period of 60 electrical degrees, the motor coil is energized so that the current level remains constant according to the total torque command signal TQ3. Then, in the following period of 60 electrical degrees, the motor coil is energized so that the current level decreases according to the decreasing torque command signal TQ2. Thereafter, a similar energization process is repeated but with a sink current (or a source current). Three phase currents each having such a trapezoidal waveform are applied while being shifted from one another by 120 electrical degrees. As a result, the energized phase to be energized according to the increasing torque command signal TQ1, the energized phase to be energized according to the decreasing torque command signal TQ2, and the energized phase to be energized according to the total torque command signal TQ3, are switched for every 60 electrical degrees.

The energization switching section 3A selects, as the energized phases for a given block of 60 electrical degrees, two phases on the source current side and one phase on the sink current side. Then, in the following block of 60 electrical degrees, the energization switching section 3A selects, as the energized phases, one phase on the source current side and two phases on the sink current side. The two energized phases that are selected on the source current side (or the sink current side) are, respectively, an energized phase to be energized according to the increasing torque command signal TQ1 and an energized phase to be energized according to the decreasing torque command signal TQ2, and these energized phases are energized with PWM control. The other energized phase selected on the other side, i.e., on the sink current side (or the source current side), is an energized phase to be energized according to the total torque command signal TQ3, and the transistor controlling the energized phase is fixed to ON. Therefore, in FIG. 2A, FIG. 2B and FIG. 2C, each hatched portion is where PWM control is performed.

The level shift section 4 has a configuration as that of the level shift section provided in the conventional motor driving device, and applies a gate voltage to the transistors of the half-bridge circuits according to the signal from the energization switching section 3A.

The oscillation section 5A produces set pulse signals SP1 and SP2 (corresponding to the "first and second set pulses" of the present invention), and outputs the set pulse signals SP1 and SP2 to the PWM control section 7A. The set pulse signals SP1 and SP2 respectively indicate timings at which PWM control signals P1 and P2, which are produced by the PWM control section 7A, are turned ON.

The comparison section 6A includes three comparators 61, 62 and 63. The comparator 61 compares the torque command signal TQ1 with a current detection signal DS to output a comparison result CR1 (corresponding to the "first comparison result" of the present invention). The comparator 62 compares the torque command signal TQ2 with the current detection signal DS to output a comparison result CR2 (corresponding to the "second comparison result" of the present invention). The comparator 63 compares the torque command signal TQ3 with the current detection signal DS to output a comparison result CR3 (corresponding to the "third comparison result" of the present invention). Note that the current detection signal DS is a signal obtained by amplifying, with the amplifier A, a voltage that is present across the current detection resistor R when the current applied to the motor coil is allowed to flow through the current detection resistor R.

The PWM control section 7A receives the set pulse signals SP1 and SP2 from the oscillation section 5A, and also receives the comparison results CR1 and CR2 from the comparison section 6A, to produce the PWM control signals P1 and P2 (corresponding to the "first and second PWM control signals" of the present invention) for realizing the application of phase currents as illustrated in FIG. 2A to FIG. 2C. The PWM control section 7A outputs the PWM control signals P1 and P2 to the energization switching section 3A, and the two energized phases on the source current side or the sink current side, which are determined by the energization switching section 3A, are PWM-controlled in parallel.

The torque command signal generation section 8 receives a torque command signal TQ (corresponding to the "original torque command signal" of the present invention), and also receives Hall signals DT21, DT22 and DT23, whose waveforms have been shaped, (corresponding to the "rotor detection signals" of the present invention) from the Hall signal processing section 2A, to produce the increasing torque command signal TQ1, the decreasing torque command signal TQ2 and the total torque command signal TQ3.

Figure 3:
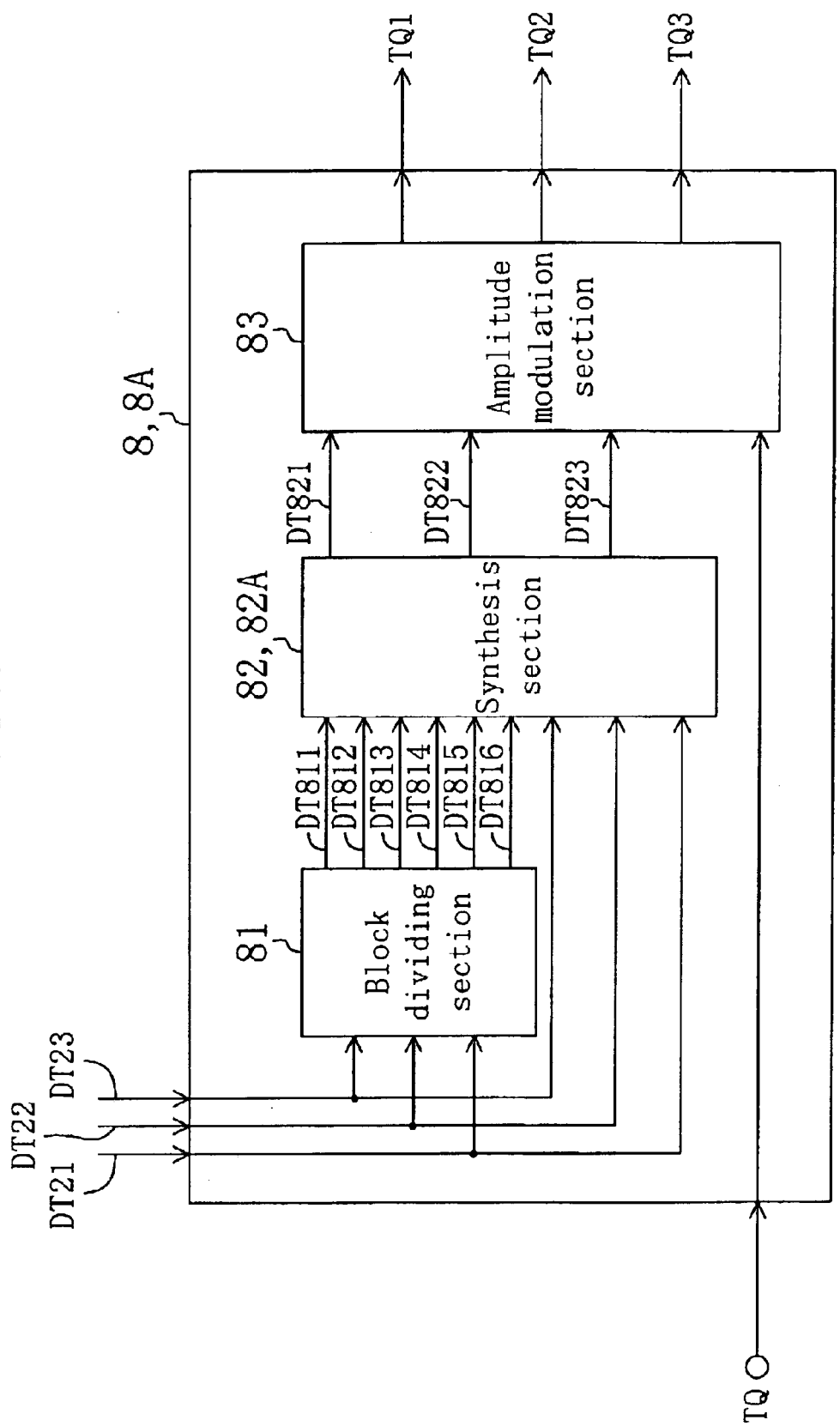
FIG. 3 is a diagram illustrating a configuration of a torque command signal generation section in the motor driving device according to the first and second embodiments of the present invention.

FIG. 3 illustrates an internal configuration of the torque command signal generation section 8. The torque command signal generation section 8 includes a block dividing section 81, a synthesis section 82, and an amplitude modulation section 83. The torque command signal generation section 8 uses the waveforms of Hall signals DT21, DT22 and DT23, as they are, to produce the torque command signals TQ1, TQ2 and TQ3.

Figure 4:
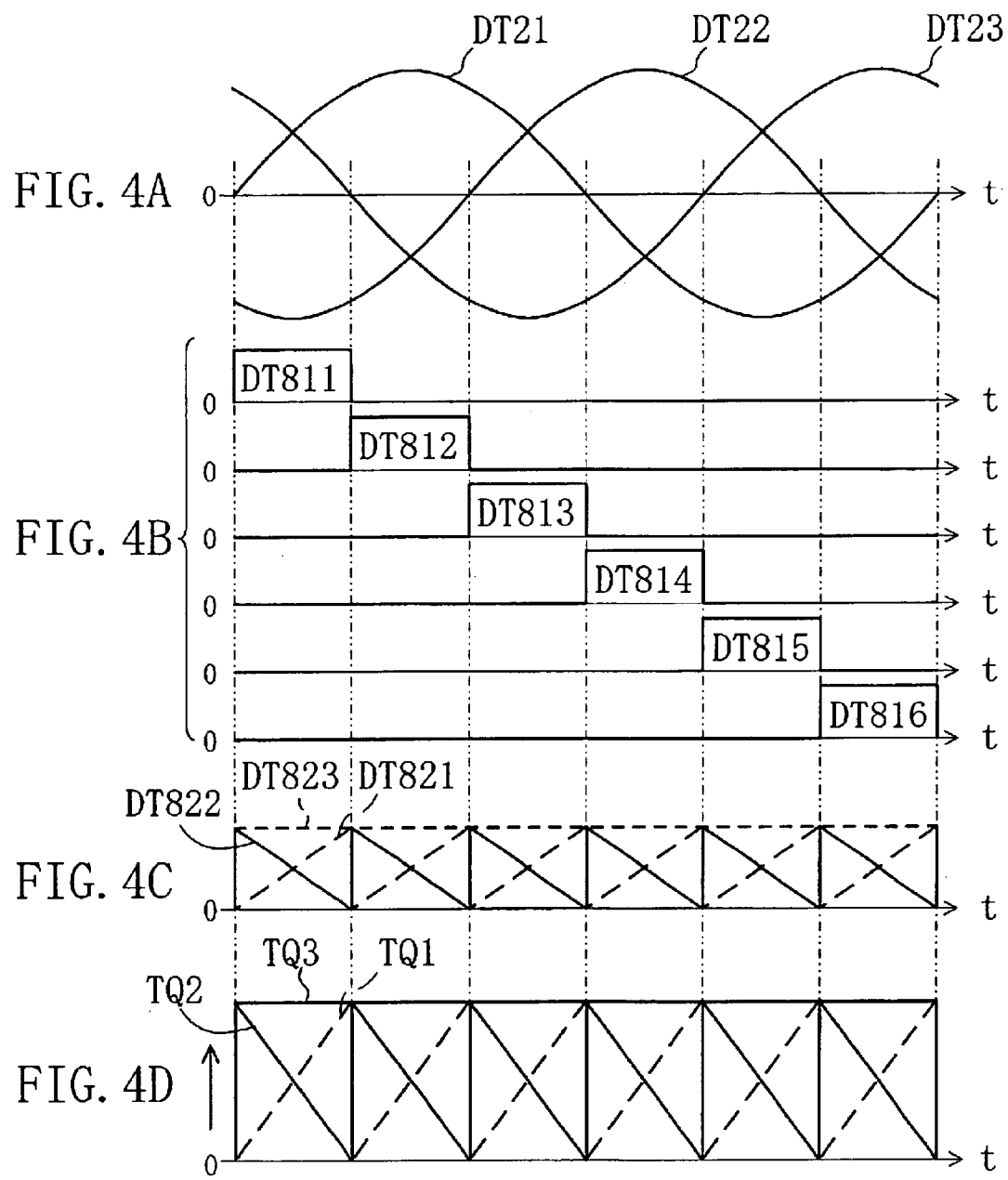
FIG. 4A to FIG. 4D are timing charts illustrating the production of the various torque command signals by the torque command signal generation section of FIG. 3 according to the first embodiment of the present invention.

First, the block dividing section 81 receives the Hall signals DT21, DT22 and DT23 (FIG. 4A) and produces divided signals DT811, DT812, DT813, DT814, DT815 and DT816 so that each divided signal has a period of 60 electrical degrees (FIG. 4B). Then, the synthesis section 82 cuts out the Hall signals DT21, DT22 and DT23 for each of the divided signals DT811, DT812, DT813, DT814, DT815 and DT816, and passes the cut-out signals through a differential circuit to produce a constantly increasing triangular wave DT821 and a constantly decreasing triangular wave DT822 (FIG. 4C). Moreover, these triangular waves DT821 and DT822 are synthesized together to produce a synthesized wave DT823, which has a constant value (FIG. 4C). Finally, the amplitude modulation section 83 modulates the amplitude of each of the triangular waves DT821 and DT822 and the synthesized wave DT823, which are produced by the synthesis section 82, according to the torque command signal TQ, thereby producing the increasing torque command signal TQ1 from the triangular wave DT821, the decreasing torque command signal TQ2 from the triangular wave DT822, and the total torque command signal TQ3 from the synthesized wave DT823.

The masking section 9 receives the comparison results CR1, CR2 and CR3 from the comparison section 6A and the PWM control signals P1 and P2 from the PWM control section 7A for selectively masking or not masking the comparison results CR1 and CR2 according to the PWM control signals P1 and P2 and the comparison result CR3. The masking operation will be described later in detail.

Figure 5:
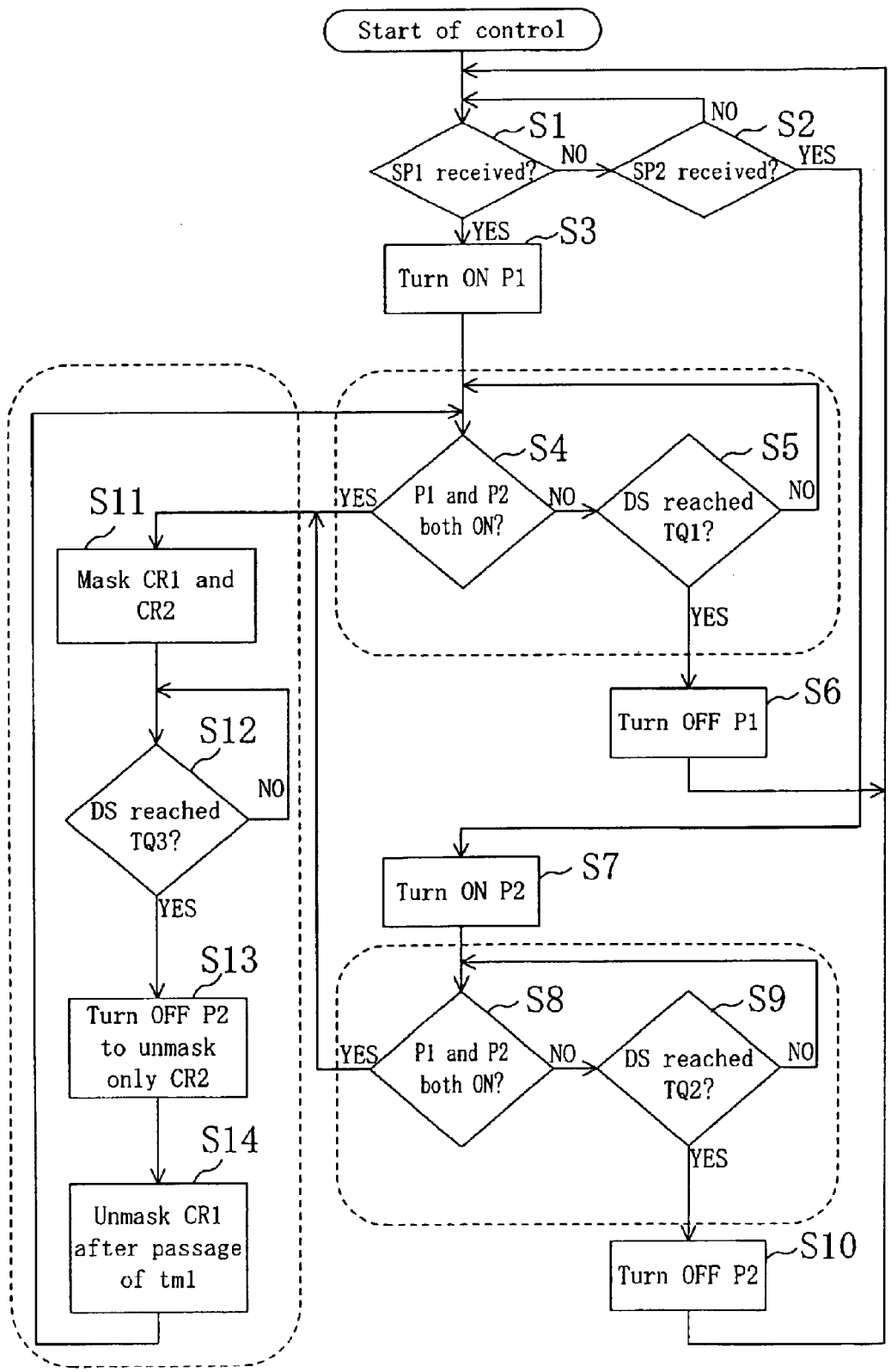
FIG. 5 is a flow chart illustrating PWM control performed by the motor driving device according to the first to sixth embodiments of the present invention.

PWM control performed by the motor driving device having such a configuration will now be described with reference to a flow chart of FIG. 5. Note that it is herein assumed that the motor is driven with a low torque and that the PWM control signals P1 and P2 are never ON at the same time.

After PWM control is initiated, the process proceeds to step S1, where it is determined whether or not the set pulse signal SP1 has been received. If not, the process proceeds to step S2, or otherwise proceeds to step S3. In step S2, it is determined whether or not the set pulse signal SP2 has been received. If not, the process returns to step S1, or otherwise proceeds to step S7.

In step S3, the PWM control signal P1 is turned ON. Then, the process proceeds to step S4, where it is determined whether or not the PWM control signals P1 and P2 are both ON. Since it is assumed herein that they are never ON at the same time, the process proceeds to step S5.

In step S5, it is determined whether or not the level of the current detection signal DS has reached that of the increasing torque command signal TQ1. If not, the process returns to step S4, or otherwise proceeds to step S6. In step S6, the PWM control signal P1 is turned OFF and the process returns to step S1.

In step S7, the PWM control signal P2 is turned ON. Then, the process proceeds to step S8, where it is determined whether or not the PWM control signals P1 and P2 are both ON. Since it is assumed herein that they are never ON at the same time, the process proceeds to step S9.

In step S9, it is determined whether or not the level of the current detection signal DS has reached that of the decreasing torque command signal TQ2. If not, the process returns to step S8, or otherwise proceeds to step S10. In step S10, the PWM control signal P2 is turned OFF and the process returns to step S1.

How the motor coils are energized with PWM control as described above will now be described with reference to timing charts of FIG. 6A to FIG. 6E, illustrating a portion of FIG. 2A to FIG. 2C around time t1 in an enlarged manner. Note that in the block of 60 electrical degrees to which time t1 belongs, the V phase and the W phase are selected as the energized phases on the source current side, while the U phase is selected as the energized phase on the sink current side. The V-phase current is PWM-controlled according to the PWM control signal P1, and the W-phase current is PWM-controlled according to the PWM control signal P2.

Figure 6A:
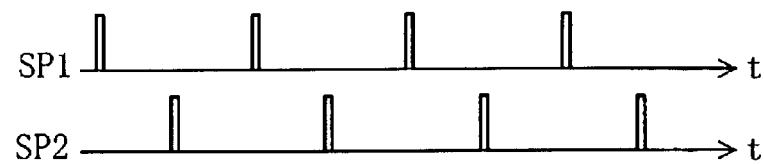
FIG. 6A to FIG. 6E are timing charts illustrating PWM control in a low-torque driving operation performed by the motor driving device according to the first to fifth embodiments of the present invention.
Figure 6B:
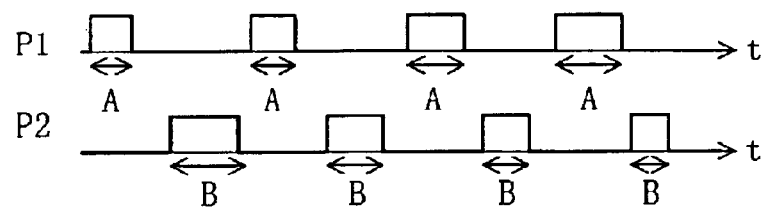
Figure 6C:
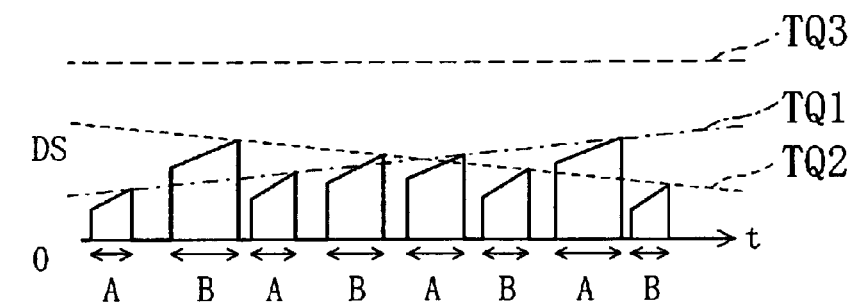
Figure 6D:
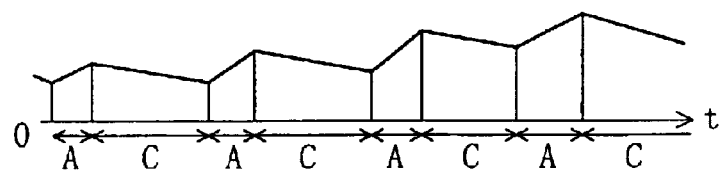
Figure 6E:
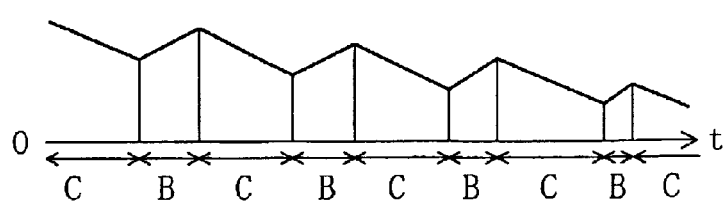

FIG. 6A illustrates the set pulse signals SP1 and SP2. Herein, it is assumed that the set pulse signals SP1 and SP2 have the same cycle, and generate pulses while being shifted from each other by half a cycle. FIG. 6B illustrates the PWM control signals P1 and P2. FIG. 6C illustrates the current detection signal DS. FIG. 6D illustrates the V-phase current, and FIG. 6E illustrates the W-phase current. Note that a period A in FIG. 6B, FIG. 6C and FIG. 6D corresponds to the ON period of the PWM control signal P1, and a period B in FIG. 6B, FIG. 6C and FIG. 6E corresponds to the ON period of the PWM control signal P2. Moreover, a regenerative current is flowing during a period C in FIG. 6D and FIG. 6E.

The PWM control section 7A receives the set pulse signal SP1 and turns ON the PWM control signal P1. As the PWM control signal P1 is turned ON, the energization switching section 3A latches ON the source-current-side transistor Tr21 of the V phase, which is an energized phase corresponding to the PWM control signal P1, via the level shift section 4, thereby allowing a source current to flow in from the power supply 1. Note that the transistor Tr12 for controlling the U phase, which is an energized phase on the sink current side, is fixed to ON in the block of 60 electrical degrees to which time t1 belongs.

Figure 7:
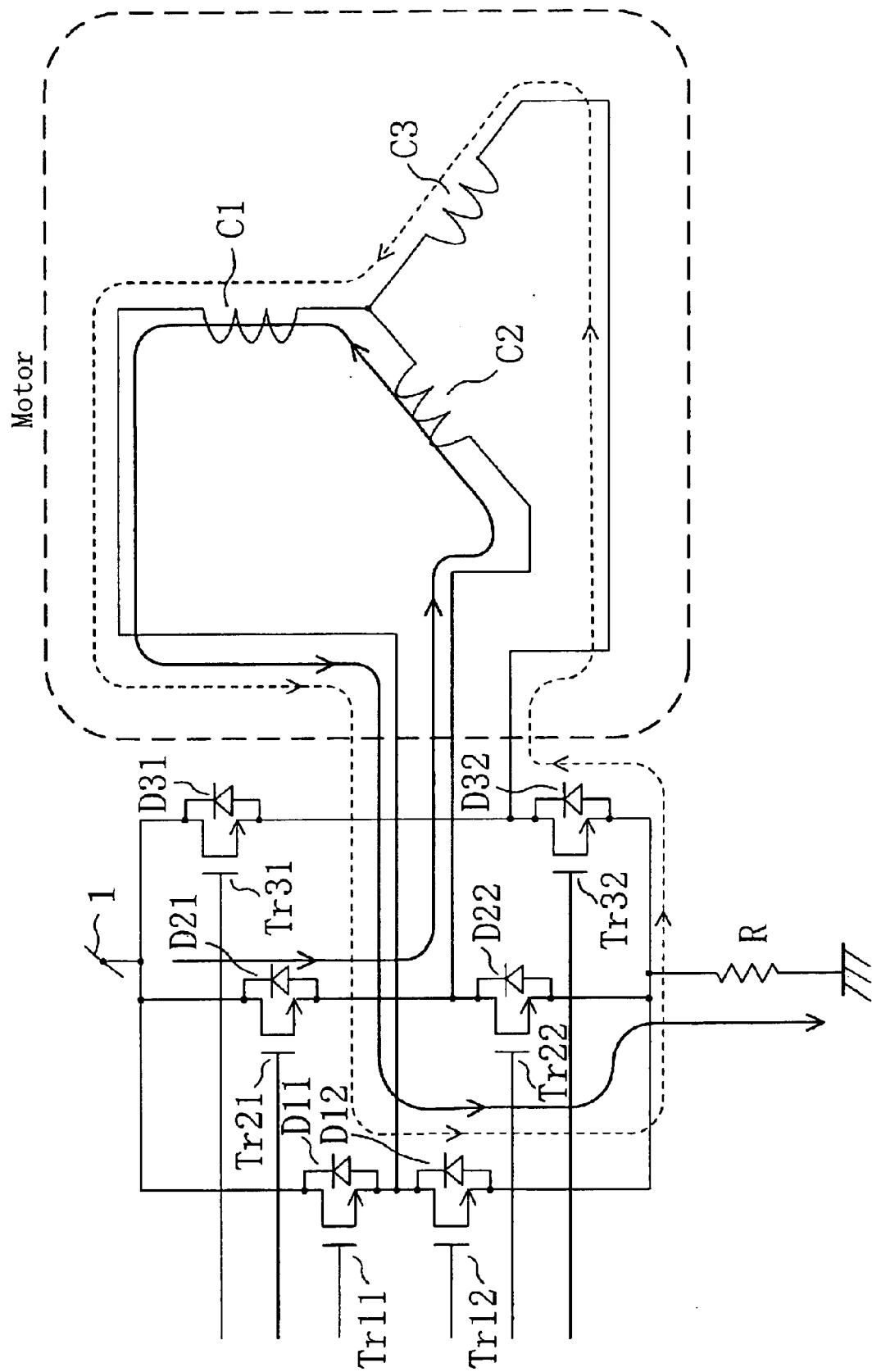
FIG. 7 is a diagram illustrating how a current flows through motor coils in the motor driving device according to the first to fifth embodiments of the present invention.

FIG. 7 illustrates the current flow through the motor coils in this operation. As the PWM control signal P1 is turned ON, the current flows from the power supply 1 through the transistor Tr21, the motor coil C2, the motor coil C1 and then through the transistor Tr12, as indicated by a solid line in FIG. 7. The current finally flows into the current detection resistor R, whereby the current detection signal DS is produced. Note that the current indicated by a broken line in FIG. 7 is a current that is flowing through the motor coils as a regenerative current in this operation.

The level of the current detection signal DS gradually increases to reach that of the increasing torque command signal TQ1 (FIG. 6C). At this point, the output of the comparison result CR1 from the comparator 61 in the comparison section 6A changes. In this operation, the masking section 9 outputs the comparison result CR1, as it is, to the PWM control section 7A without performing a masking operation.

The PWM control section 7A receives the comparison result CR1 to detect the level of the current detection signal DS having reached that of the increasing torque command signal TQ1, and turns OFF the PWM control signal P1. Thus, the transistor Tr21 is latched OFF. Then, due to the electric energy remaining in the motor coil, a regenerative current flows through the motor coil C2, the motor coil C1, the transistor Tr12 and then through the diode D22.

Then, the PWM control section 7A receives the set pulse signal SP2 and turns ON the PWM control signal P2. As the PWM control signal P2 is turned ON, the energization switching section 3A latches ON the source-current-side transistor Tr31 of the W phase, which is an energized phase corresponding to the PWM control signal P2, via the level shift section 4, thereby allowing a source current to flow in from the power supply 1. Note that the transistor Tr12 for controlling the U phase, which is an energized phase on the sink current side, continues to be ON.

Figure 8:
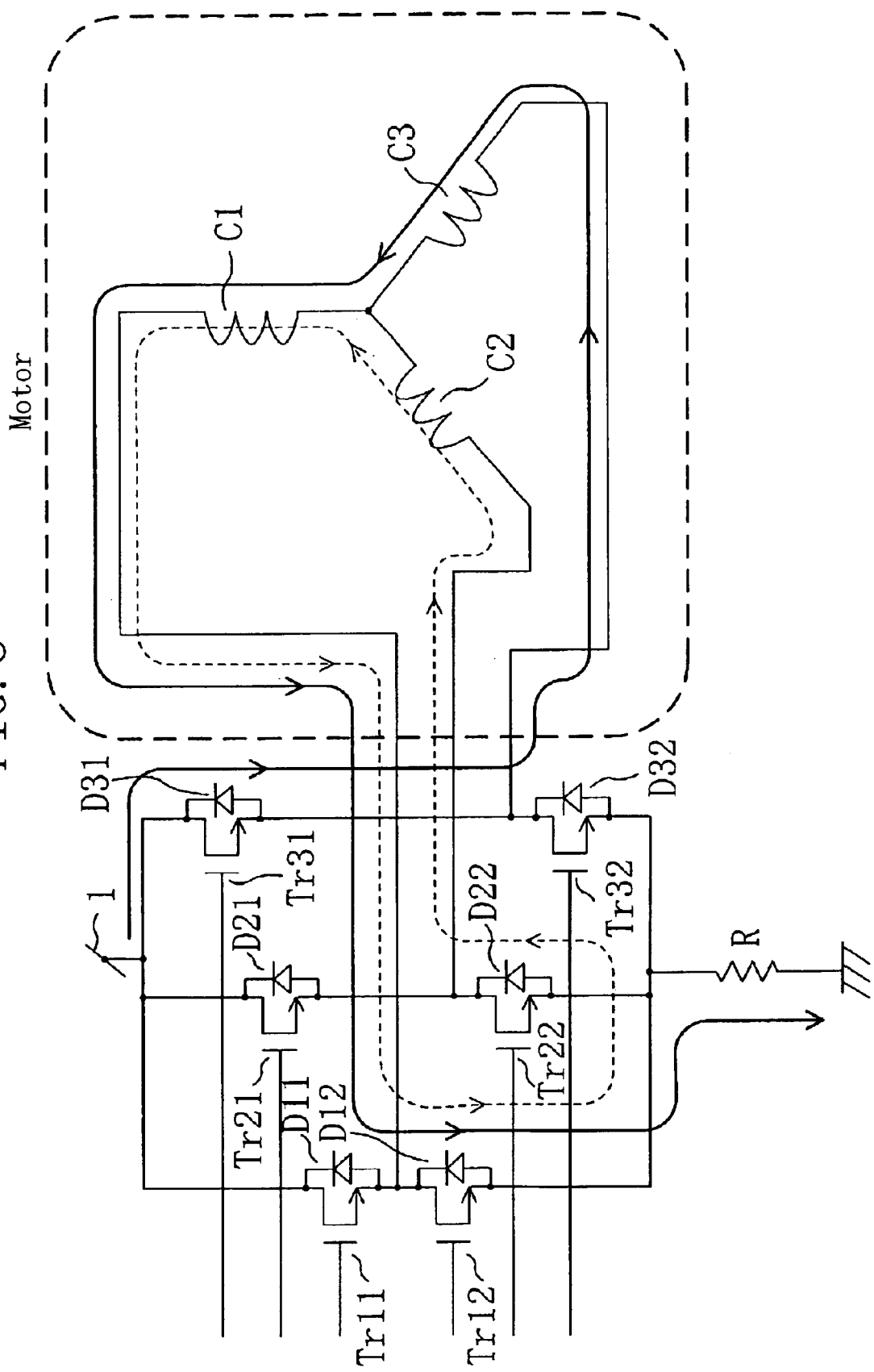
FIG. 8 is a diagram illustrating how a current flows through motor coils in the motor driving device according to the first to fifth embodiments of the present invention.

FIG. 8 illustrates the current flow through the motor coils in this operation. As the PWM control signal P2 is turned ON, the current flows from the power supply 1 through the transistor Tr31, the motor coil C3, the motor coil C1 and then through the transistor Tr12, as indicated by a solid line in FIG. 8. The current finally flows into the current detection resistor R, whereby the current detection signal DS is produced. Note that the current indicated by a broken line in FIG. 8 is a current that has been flowing through the motor coils as a regenerative current after turning OFF the PWM control signal P1.

The level of the current detection signal DS gradually increases to reach that of the decreasing torque command signal TQ2 (FIG. 6C). At this point, the output of the comparison result CR2 from the comparator 62 in the comparison section 6A changes. In this operation, the masking section 9 outputs the comparison result CR2, as it is, to the PWM control section 7A without performing a masking operation.

The PWM control section 7A receives the comparison result CR2 to detect the level of the current detection signal DS having reached that of the decreasing torque command signal TQ2, and turns OFF the PWM control signal P2. Thus, the transistor Tr31 is latched OFF. Then, due to the electric energy remaining in the motor coil, a regenerative current flows through the motor coil C3, the motor coil C1, the transistor Tr12 and then through the diode D32.

Next, PWM control performed in the block of 60 electrical degrees to which time t2 belongs in FIG. 2A to FIG. 2C will be described. This block follows the one to which time t1 belongs. In the block of 60 electrical degrees to which time t2 belongs, the V phase is selected as the energized phase on the source current side, and the U phase and the W phase are selected as the energized phases on the sink current side. The W-phase current is PWM-controlled according to the PWM control signal P1, and the U-phase current is PWM-controlled according to the PWM control signal P2. Note that FIG. 6A to FIG. 6E will be referred to again as timing charts illustrating a portion around time t2 in an enlarged manner. For this purpose, it is now assumed that FIG. 6D illustrates the W-phase sink current and FIG. 6E illustrates the U-phase sink current.

The PWM control section 7A receives the set pulse signal SP1 and turns ON the PWM control signal P1. As the PWM control signal P1 is turned ON, the energization switching section 3A latches ON the sink-current-side transistor Tr32 of the W phase, which is an energized phase corresponding to the PWM control signal P1, via the level shift section 4. Note that the transistor Tr21 for controlling the V phase, which is an energized phase on the source current side, is fixed to ON in the block of 60 electrical degrees to which time t2 belongs.

Figure 9:
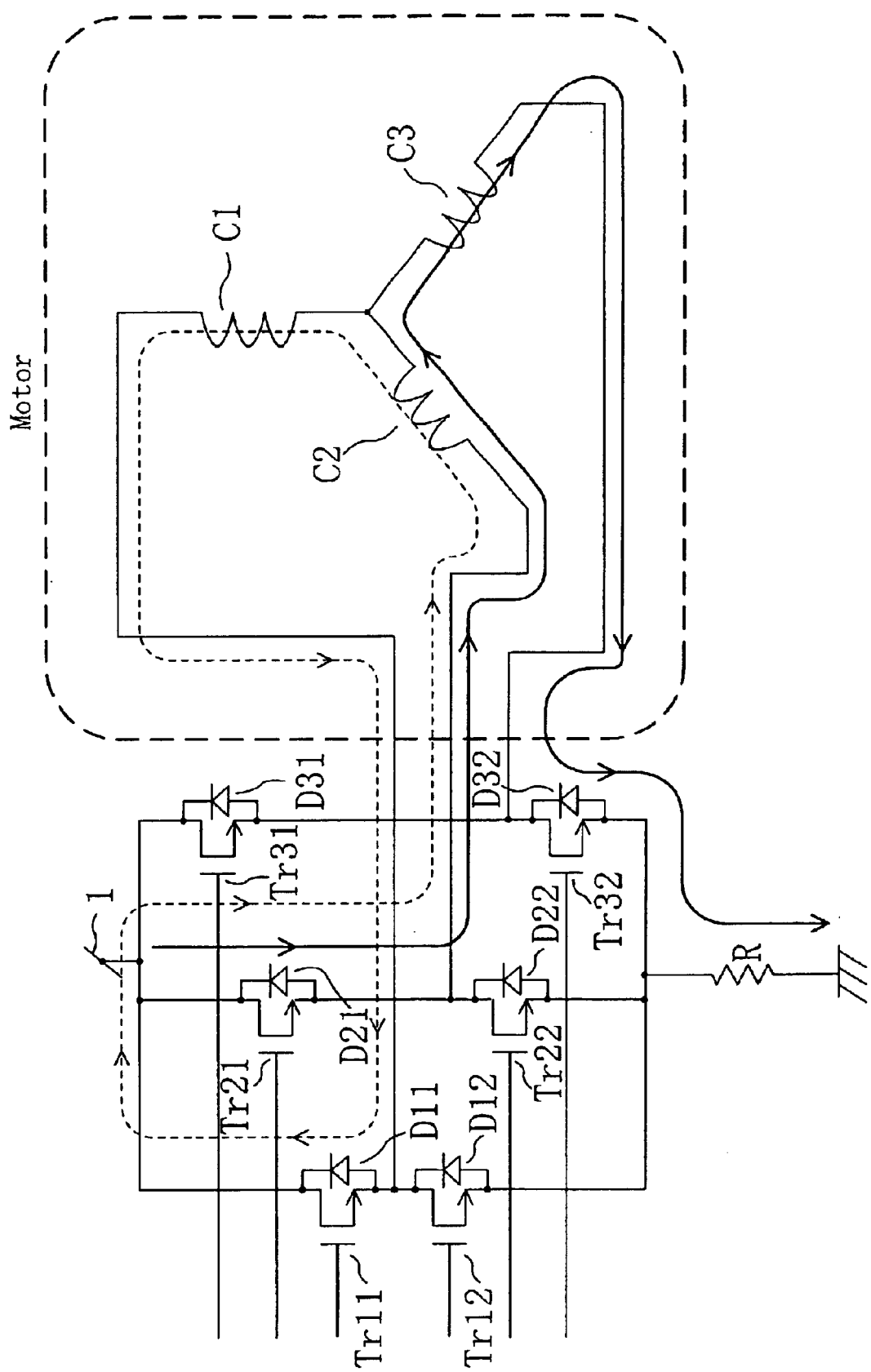
FIG. 9 is a diagram illustrating how a current flows through motor coils in the motor driving device according to the first to fifth embodiments of the present invention.

FIG. 9 illustrates the current flow through the motor coils in this operation. As the PWM control signal P1 is turned ON, the current flows from the power supply 1 through the transistor Tr21, the motor coil C2, the motor coil C3 and then through the transistor Tr32, as indicated by a solid line in FIG. 9. The current finally flows into the current detection resistor R, whereby the current detection signal DS is produced. Note that the current indicated by a broken line in FIG. 9 is a current that is flowing through the motor coils as a regenerative current in this operation.

The level of the current detection signal DS gradually increases to reach that of the increasing torque command signal TQ1 (FIG. 6C). At this point, the output of the comparison result CR1 from the comparator 61 in the comparison section 6A changes. In this operation, the masking section 9 outputs the comparison result CR1, as it is, to the PWM control section 7A without performing a masking operation.

The PWM control section 7A receives the comparison result CR1 to detect the level of the current detection signal DS having reached that of the increasing torque command signal TQ1, and turns OFF the PWM control signal P1. Thus, the transistor Tr32 is latched OFF. Then, due to the electric energy remaining in the motor coil, a regenerative current flows through the motor coil C2, the motor coil C3, the diode D31 and then through the transistor Tr21.

Then, the PWM control section 7A receives the set pulse signal SP2 and turns ON the PWM control signal P2. As the PWM control signal P2 is turned ON, the energization switching section 3A latches ON the sink-current-side transistor Tr12 of the U phase, which is an energized phase corresponding to the PWM control signal P2, via the level shift section 4. Note that the transistor Tr21 for controlling the V phase, which is an energized phase on the source current side, continues to be ON.

Figure 10:
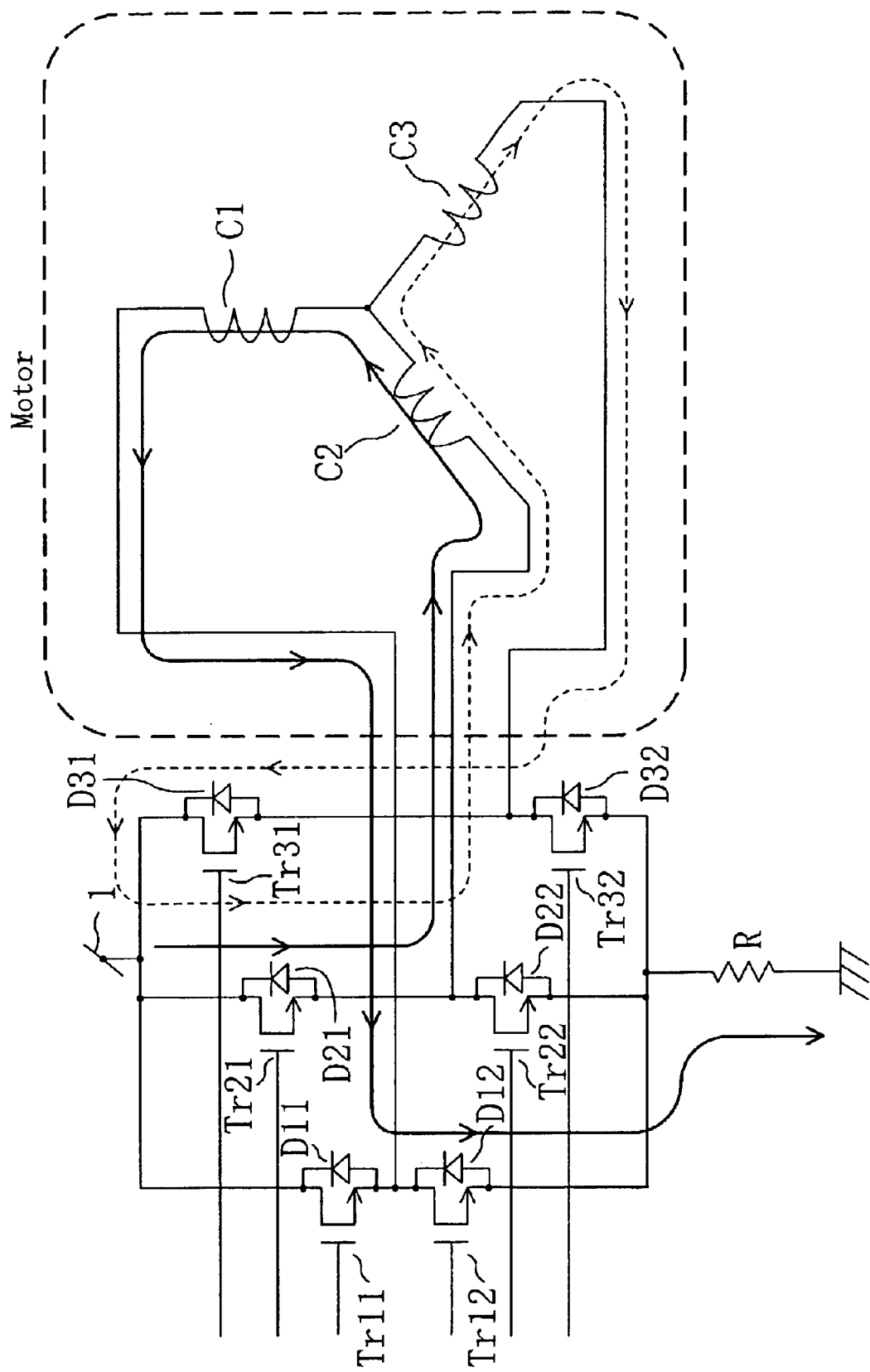
FIG. 10 is a diagram illustrating how a current flows through motor coils in the motor driving device according to the first to fifth embodiments of the present invention.

FIG. 10 illustrates the current flow through the motor coils in this operation. As the PWM control signal P2 is turned ON, the current flows from the power supply 1 through the transistor Tr21, the motor coil C2, the motor coil C1 and then through the transistor Tr12, as indicated by a solid line in FIG. 10. The current finally flows into the current detection resistor R, whereby the current detection signal DS is produced. Note that the current indicated by a broken line in FIG. 10 is a current that has been flowing through the motor coils as a regenerative current after turning OFF the PWM control signal P1.

The level of the current detection signal DS gradually increases to reach that of the decreasing torque command signal TQ2 (FIG. 6C). At this point, the output of the comparison result CR2 from the comparator 62 in the comparison section 6A changes. In this operation, the masking section 9 outputs the comparison result CR2, as it is, to the PWM control section 7A without performing a masking operation.

The PWM control section 7A receives the comparison result CR2 to detect the level of the current detection signal DS having reached that of the decreasing torque command signal TQ2, and turns OFF the PWM control signal P2. Thus, the transistor Tr12 is latched OFF. Then, due to the electric energy remaining in the motor coil, a regenerative current flows through the motor coil C2, the motor coil C1, the diode D11 and then the transistor Tr21.

PWM control has been described above assuming a case where the motor is driven with a low torque and assuming that the PWM control signals P1 and P2 are never ON at the same time. Next, assume a case where the motor is driven with a high torque. When the motor is driven with a high torque, the amount of current applied through the motor coils increases. Therefore, the PWM control signals P1 and P2 can both be ON at the same time, whereby two phases on the source current side or the sink current side are energized at the same time. PWM control performed in a case where the PWM control signals P1 and P2 can both be ON at the same time will be described with reference to a flow chart of FIG. 5.

When the PWM control signals P1 and P2 are both ON, the process proceeds from step S4 or S8 to step S11. In step S11, the comparison results CR1 and CR2 from the comparison section 6A are masked, and the process proceeds to step S12. The comparison results CR1 and CR2 are masked for the following reason. When the PWM control signals P1 and P2 are both ON, the current detection signal DS represents the sum of the currents that are being simultaneously applied to two phases on the source current side or the sink current side. Therefore, the increasing torque command signal TQ1 and the decreasing torque command signal TQ2 should not be compared with the current detection signal DS in such a state, because if such a comparison is made, an erroneous comparison result is to be output.

In step S12, it is determined whether or not the level of the current detection signal DS has reached that of the total torque command signal TQ3. Step S12 is repeated until the determination result is true. When the determination result is true, the process proceeds to step S13.

In step S13, the PWM control signal P2 is turned OFF to unmask only the comparison result CR2, and the process proceeds to step S14. The PWM control signal P2 is turned OFF prior to the PWM control signal P1 for the following reason. The PWM control signal P1 is for PWM control of a phase current according to the increasing torque command signal TQ1, whereas the PWM control signal P2 is for PWM control of a phase current according to the decreasing torque command signal TQ2. Therefore, a longer ON period is required for the PWM control signal P1, which is used for performing a control in which an electric energy is gradually increased, than for the PWM control signal P2, which is used for performing a control in which an electric energy is gradually decreased. In view of this, the PWM control signal P2 is first turned OFF so that the ON period of the PWM control signal P1 is as long as possible.

Then, in step S14, the comparison result CR1 is unmasked after the passage of a predetermined period tm1 from the point in time when the level of the current detection signal DS reaches that of the total torque command signal TQ3 in step S12, and the process returns to step S4. The predetermined period tm1 is provided before the unmasking of the comparison result CR1 for the following reason. As the PWM control signal P2 is turned OFF in step S13, the current detection signal DS represents the current being applied by the PWM control signal P1 being ON. However, immediately after turning OFF the PWM control signal P2, some electric energy remains in the amplifier A from immediately before turning OFF the PWM control signal P2, whereby the comparison result CR1 is likely to be erroneous. Preferably, the predetermined period tm1 is about on the order of 100 ns.

How the motor coils are energized with PWM control as described above will now be described with reference to timing charts of FIG. 11A to FIG. 11E, illustrating a portion of FIG. 2A to FIG. 2C around time t1 in an enlarged manner. Note that in the block of 60 electrical degrees to which time t1 belongs, the V phase and the W phase are selected as the energized phases on the source current side, while the U phase is selected as the energized phase on the sink current side. The V-phase current is PWM-controlled according to the PWM control signal P1, and the W-phase current is PWM-controlled according to the PWM control signal P2.

Figure 11A:
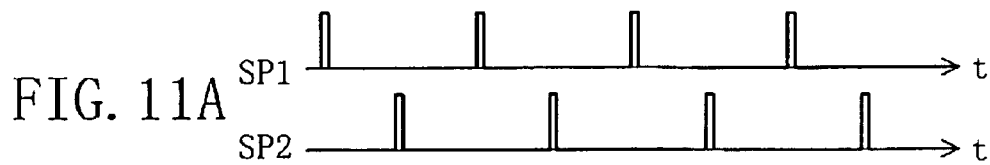
FIG. 11A to FIG. 11E are timing charts illustrating PWM control in a high-torque driving operation performed by the motor driving device according to the first to fifth embodiments of the present invention.
Figure 11B:
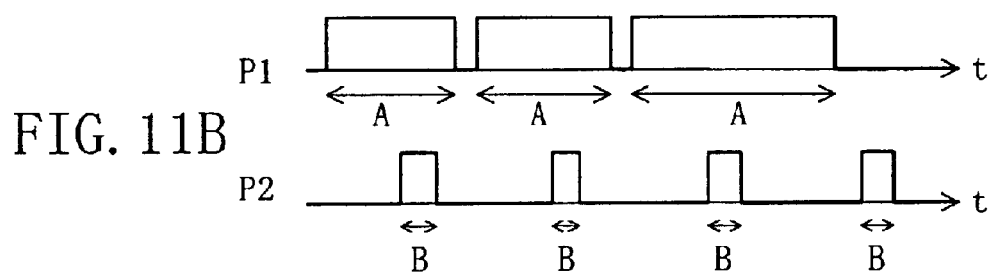
Figure 11C:
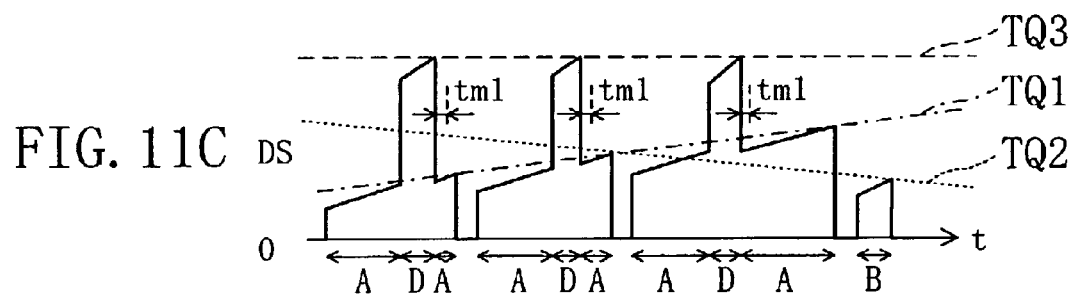
Figure 11D:
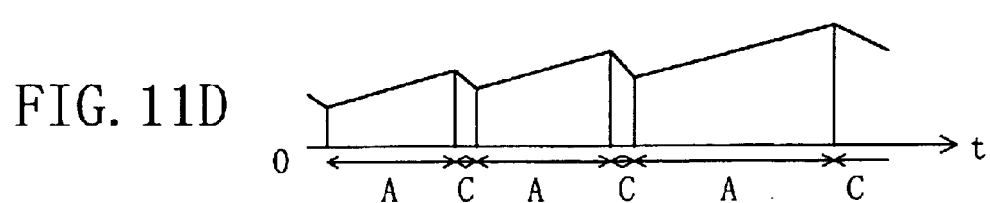
Figure 11E:
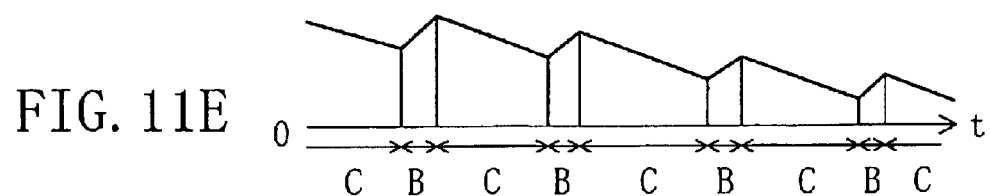

FIG. 11A illustrates the set pulse signals SP1 and SP2. Herein, it is assumed that the set pulse signals SP1 and SP2 have the same cycle, and generate pulses at respective timings that are shifted from each other by half a cycle. FIG. 11B illustrates the PWM control signals P1 and P2. FIG. 11C illustrates the current detection signal DS. FIG. 11D illustrates the V-phase current, and FIG. 11E illustrates the W-phase current. Note that a period A in FIG. 11B, FIG. 11C and FIG. 11D corresponds to the ON period of the PWM control signal P1, and a period B in FIG. 11B, FIG. 11C and FIG. 11E corresponds to the ON period of the PWM control signal P2. A regenerative current is flowing during a period C in FIG. 11D and FIG. 11E. Moreover, a period D in FIG. 11C corresponds to the ON period in which the PWM control signals P1 and P2 are both ON.

The PWM control section 7A receives the set pulse signal SP1 and turns ON the PWM control signal P1. As the PWM control signal P1 is turned ON, the energization switching section 3A latches ON the source-current-side transistor Tr21 of the V phase, which is an energized phase corresponding to the PWM control signal P1, via the level shift section 4, thereby allowing a source current to flow in from the power supply 1. Note that the transistor Tr12 for controlling the U phase, which is an energized phase on the sink current side, is fixed to ON in the block of 60 electrical degrees to which time t1 belongs.

The level of the current detection signal DS gradually increases to reach a level close to that of the increasing torque command signal TQ1 (FIG. 11C). However, before it reaches the level of the increasing torque command signal TQ1, the PWM control section 7A receives the set pulse signal SP2 and turns ON the PWM control signal P2. As the PWM control signal P2 is turned ON, the energization switching section 3A latches ON the source-current-side transistor Tr31 of the W phase, which is an energized phase corresponding to the PWM control signal P2, via the level shift section 4, thereby allowing a source current to flow in from the power supply 1. At this point in time, the simultaneous energization of two phases, i.e., the V phase and the W phase, begins.

The masking section 9 detects that the PWM control signals P1 and P2 are both ON to mask the comparison results CR1 and CR2 from the comparison section 6A before they are output to the PWM control section 7A. With the comparison results CR1 and CR2 being masked, the PWM control section 7A does not turn OFF the PWM control signals P1 and P2. As a result, the energization of the V phase and the W phase continues.

The level of the current detection signal DS gradually increases to reach that of the total torque command signal TQ3. At this point, the output of the comparison result CR3 from the comparator 63 in the comparison section 6A changes. The masking section 9 receives the comparison result CR3 to detect that the level of the current detection signal DS has reached that of the total torque command signal TQ3, thereby unmasking the comparison result CR2.

The PWM control section 7A receives the comparison result CR2 to detect that the level of the current detection signal DS has reached that of the decreasing torque command signal TQ2, thereby turning OFF the PWM control signal P2. Thus, the transistor Tr31 is latched OFF. Then, due to the electric energy remaining in the motor coil, a regenerative current flows.

The masking section 9 unmasks the comparison result CR1 after the passage of a predetermined period tm1 from the point in time when the level of the current detection signal DS reaches that of the total torque command signal TQ3. At this point, the level of the current detection signal DS has not yet reached that of the increasing torque command signal TQ1.

The level of the current detection signal DS gradually increases to reach that of the increasing torque command signal TQ1. At this point, the output of the comparison result CR1 from the comparator 61 in the comparison section 6A changes. The PWM control section 7A receives the comparison result CR1 to detect that the level of the current detection signal DS has reached that of the increasing torque command signal TQ1, thereby turning OFF the PWM control signal P1. Thus, the transistor Tr21 is latched OFF. Then, due to the electric energy remaining in the motor coil, a regenerative current flows.

Next, PWM control performed in the block of 60 electrical degrees to which time t2 belongs in FIG. 2A to FIG. 2C will be described. This block follows the one to which time t1 belongs. In the block of 60 electrical degrees to which time t2 belongs, the V phase is selected as the energized phase on the source current side, and the U phase and the W phase are selected as the energized phases on the sink current side. The W-phase current is PWM-controlled according to the PWM control signal P1, and the U-phase current is PWM-controlled according to the PWM control signal P2. Note that FIG. 11A to FIG. 11E will be referred to again as timing charts illustrating a portion around time t2 in an enlarged manner. For this purpose, it is now assumed that FIG. 11D illustrates the W-phase sink current and FIG. 11E illustrates the U-phase sink current.

The PWM control section 7A receives the set pulse signal SP1 and turns ON the PWM control signal P1. As the PWM control signal P1 is turned ON, the energization switching section 3A latches ON the sink-current-side transistor Tr32 of the W phase, which is an energized phase corresponding to the PWM control signal P1, via the level shift section 4. Note that the transistor Tr21 for controlling the V phase, which is an energized phase on the source current side, is fixed to ON in the block of 60 electrical degrees to which time t2 belongs.

The level of the current detection signal DS gradually increases to reach a level close to that of the increasing torque command signal TQ1 (FIG. 11C). However, before it reaches the level of the increasing torque command signal TQ1, the PWM control section 7A receives the set pulse signal SP2 and turns ON the PWM control signal P2. As the PWM control signal P2 is turned ON, the energization switching section 3A latches ON the sink-current-side transistor Tr12 of the U phase, which is an energized phase corresponding to the PWM control signal P2, via the level shift section 4. At this point in time, the simultaneous energization of two phases, i.e., the U phase and the W phase, begins.

The masking section 9 detects that the PWM control signals P1 and P2 are both ON to mask the comparison results CR1 and CR2 from the comparison section 6A before they are output to the PWM control section 7A. With the comparison results CR1 and CR2 being masked, the PWM control section 7A does not turn OFF the PWM control signals P1 and P2. As a result, the energization of the U phase and the W phase continues.

The level of the current detection signal DS gradually increases to reach that of the total torque command signal TQ3. At this point, the output of the comparison result CR3 from the comparator 63 in the comparison section 6A changes. The masking section 9 receives the comparison result CR3 to detect that the level of the current detection signal DS has reached that of the total torque command signal TQ3, thereby unmasking the comparison result CR2.

The PWM control section 7A receives the comparison result CR2 to detect that the level of the current detection signal DS has reached that of the decreasing torque command signal TQ2, thereby turning OFF the PWM control signal P2. Thus, the transistor Tr12 is latched OFF. Then, due to the electric energy remaining in the motor coil, a regenerative current flows.

The masking section 9 unmasks the comparison result CR1 after the passage of a predetermined period tm1 from the point in time when the level of the current detection signal DS reaches that of the total torque command signal TQ3. At this point, the level of the current detection signal DS has not yet reached that of the increasing torque command signal TQ1.

The level of the current detection signal DS gradually increases to reach that of the increasing torque command signal TQ1. At this point, the output of the comparison result CR1 from the comparator 61 in the comparison section 6A changes. The PWM control section 7A receives the comparison result CR1 to detect that the level of the current detection signal DS has reached that of the increasing torque command signal TQ1, thereby turning OFF the PWM control signal P1. Thus, the transistor Tr32 is latched OFF. Then, due to the electric energy remaining in the motor coil, a regenerative current flows.

As described above, according to the present embodiment, two phases that are selected as energized phases are energized with PWM control in parallel, whereby the phase currents can transition smoothly. In this way, it is possible to suppress vibrations of the motor and thus reduce noise from the motor. Moreover, since the transition from low-torque control to high-torque control is done smoothly, effects as those described above can be obtained for any torque.

Note that in the description above, the PWM control signal P2 is turned OFF when the level of the current detection signal DS reaches that of the total torque command signal TQ3 during a period in which the PWM control signals P1 and P2 are both ON. Alternatively, the PWM control signal P1 may be turned OFF first. However, if the PWM control signal P1, which is used for performing a control in which an electric energy is gradually increased, is turned OFF first, energization at a level according to the increasing torque command signal TQ1 will be more difficult. Therefore, it is preferred that the PWM control signal P2 is turned OFF first. Moreover, in another alternative control, the PWM control signal P1 may be turned OFF if the level of the current detection signal DS reaches that of the total torque command signal TQ3 in the first half of the cycle of the total torque command signal TQ3, while turning OFF the PWM control signal P2 if it happens in the latter half of the cycle.

Moreover, while the amplifier A is provided in the motor driving device described above, the amplifier A may alternatively be omitted, in which case the voltage across the current detection resistor R can be used directly as the current detection signal DS. Moreover, while the current detection resistor R is shown to be connected on the low-potential side, it may alternatively be connected at a position on the high-potential side, e.g., immediately after the power supply 1.

Moreover, while the comparison section 6A described above includes three comparators 61, 62 and 63, only one comparator may suffice if a torque command signal to be compared with the current detection signal DS is selected in synchronization with the PWM control signals P1 and P2.

Moreover, a regenerative current in the motor coil is described above to flow through a diode that is connected between the source and the drain of each transistor of the half-bridge circuits. Instead of providing the diode, a phase-inverted synchronization control may alternatively be performed for a transistor connected in series with the transistor that has been turned ON at a shifted timing so that a through current does not flow through the half-bridge circuit. In this way, it is possible to eliminate the voltage drop loss occurring when energizing the diode, and to reduce the power consumed by the motor driving device. Moreover, the transistor may be a power BJT, a power MOS, an IGBT, or the like.

Moreover, in the description above, Hall signals are received from Hall elements for detecting the rotor position. Instead of using Hall signals, the rotor position may be detected based on the counter electromotive force of the motor coil in the case of a sensor-less motor.

Second Embodiment

A motor driving device according to the second embodiment of the present invention includes a torque command signal generation section 8A that is different in configuration from the torque command signal generation section 8 in the motor driving device of the first embodiment. Other than this, the configuration and the operation of the motor driving device are as those of the first embodiment, and thus will not be further described below. Various elements and signals used in the motor driving device of the present embodiment will be denoted by the same reference numerals as those used in FIG. 1.

The motor driving device of the present embodiment drives a motor by using a sinusoidal-wave phase current. FIG. 12A illustrates a phase current (a U-phase current, a V-phase current and a W-phase current) to be applied to the energized phase, which is determined by the energization switching section 3A. FIG. 12B illustrates various torque command signals each for determining the current level of the phase current. In FIG. 12A, a portion above the time axis represents the application of the source current, and a portion below the time axis represents the application of the sink current.

FIG. 12B illustrates the increasing torque command signal TQ1 (corresponding to the "first torque command signal" of the present invention), the decreasing torque command signal TQ2 (corresponding to the "second torque command signal" of the present invention), and the total torque command signal TQ3 (corresponding to the "third torque command signal" of the present invention). Each of the torque command signals TQ1, TQ2 and TQ3 is a signal whose cycle has a period that corresponds to 60 electrical degrees in the cycle of the phase current, and is produced by the torque command signal generation section 8A. During a period of 60 electrical degrees, the increasing torque command signal TQ1 keeps increasing, whereas the decreasing torque command signal TQ2 keeps decreasing. The total torque command signal TQ3 is obtained by synthesizing the increasing torque command signal TQ1 with the decreasing torque command signal TQ2.

The torque command signal generation section 8A receives the torque command signal TQ (corresponding to the "original torque command signal" of the present invention), and also receives the Hall signals DT21, DT22 and DT23, whose waveforms have been shaped, from the Hall signal processing section 2A, to produce the increasing torque command signal TQ1, the decreasing torque command signal TQ2 and the total torque command signal TQ3.

FIG. 3 illustrates an internal configuration of the torque command signal generation section 8A. The torque command signal generation section 8A includes the block dividing section 81, a synthesis section 82A, and the amplitude modulation section 83. The torque command signal generation section 8A uses the waveforms of the Hall signals DT21, DT22 and DT23, as they are, to produce the various torque command signals.

First, the block dividing section 81 receives the Hall signals DT21, DT22 and DT23 (FIG. 13A) and produces divided signals DT811, DT812, DT813, DT814, DT815 and DT816 so that each divided signal has a period of 60 electrical degrees (FIG. 13B). Then, the synthesis section 82A cuts out first, second and third sinusoidal waves DT821, DT822 and DT823 from the Hall signals DT21, DT22 and DT23 for each of the divided signals DT811, DT812, DT813, DT814, DT815 and DT816 (FIG. 13C). The first sinusoidal wave DT821 extends from an electric angle of 0° to an electric angle of 60°, the second sinusoidal wave DT822 extends from an electric angle of 120° to an electric angle of 180°, and the third sinusoidal wave DT823 extends from an electric angle of 60° to an electric angle of 120°. Finally, the amplitude modulation section 83 modulates the amplitude of each of the first, second and third sinusoidal waves DT821, DT822 and DT823, which are produced by the synthesis section 82A, according to the torque command signal TQ, thereby producing the increasing torque command signal TQ1 from the first sinusoidal wave DT821, the decreasing torque command signal TQ2 from the second sinusoidal wave DT822, and the total torque command signal TQ3 from the third sinusoidal wave DT823.

As described above, according to the present embodiment, a sinusoidal-wave phase current can be applied through the motor coils, whereby it is possible to further reduce vibrations and noise of the motor.

Note that in the description above, Hall signals are received from Hall elements for detecting the rotor position. Instead of using Hall signals, the rotor position may be detected based on the counter electromotive force of the motor coil in the case of a sensor-less motor.

Third Embodiment

A motor driving device according to the third embodiment of the present invention includes a torque command signal generation section 8B that is different in configuration from the torque command signal generation section 8 in the motor driving device of the first embodiment. Other than this, the configuration and the operation of the motor driving device are as those of the first embodiment, and thus will not be further described below. Various elements and signals used in the motor driving device of the present embodiment will be denoted by the same reference numerals as those used in FIG. 1.

The torque command signal generation section 8B receives the torque command signal TQ (corresponding to the "original torque command signal" of the present invention), and also receives the Hall signals DT21, DT22 and DT23, whose waveforms have been shaped, from the Hall signal processing section 2A, to produce the increasing torque command signal TQ1, the decreasing torque command signal TQ2 and the total torque command signal TQ3. These torque command signals are step-wave signals.

Figure 14:
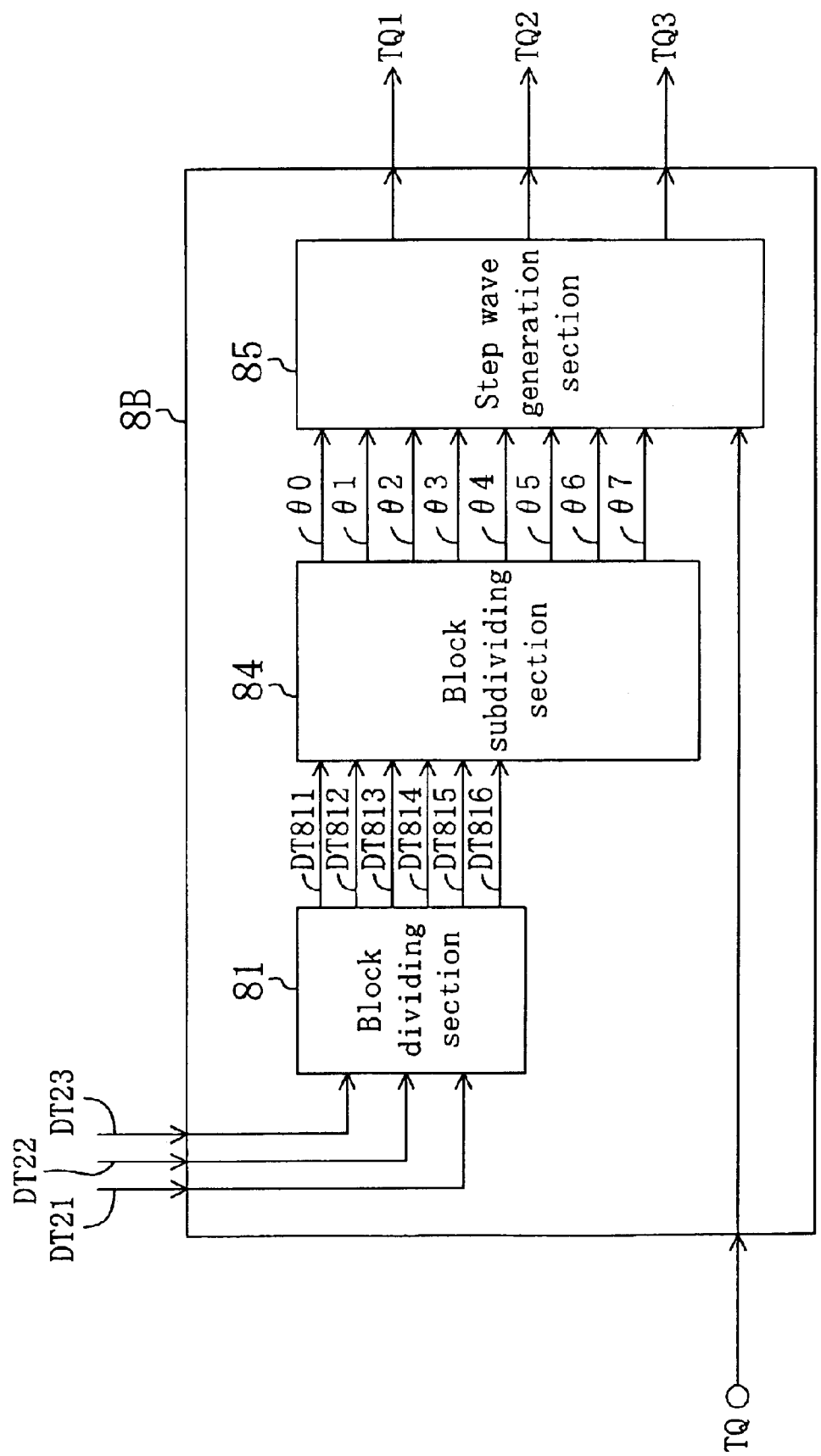
FIG. 14 is a diagram illustrating a configuration of a torque command signal generation section in the motor driving device according to the third embodiment of the present invention.

FIG. 14 illustrates an internal configuration of the torque command signal generation section 8B. The torque command signal generation section 8B includes the block dividing section 81, a block subdividing section 84 and a step wave generation section 85.

Figure 15A:
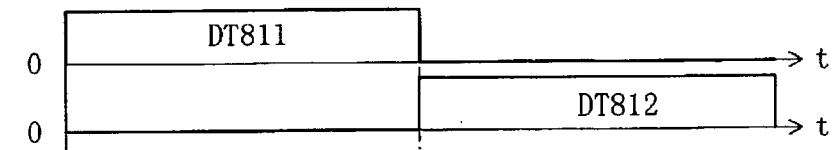
FIG. 15A to FIG. 15C are timing charts illustrating the production of the various torque command signals by the torque command signal generation section of FIG. 14.
Figure 15B:
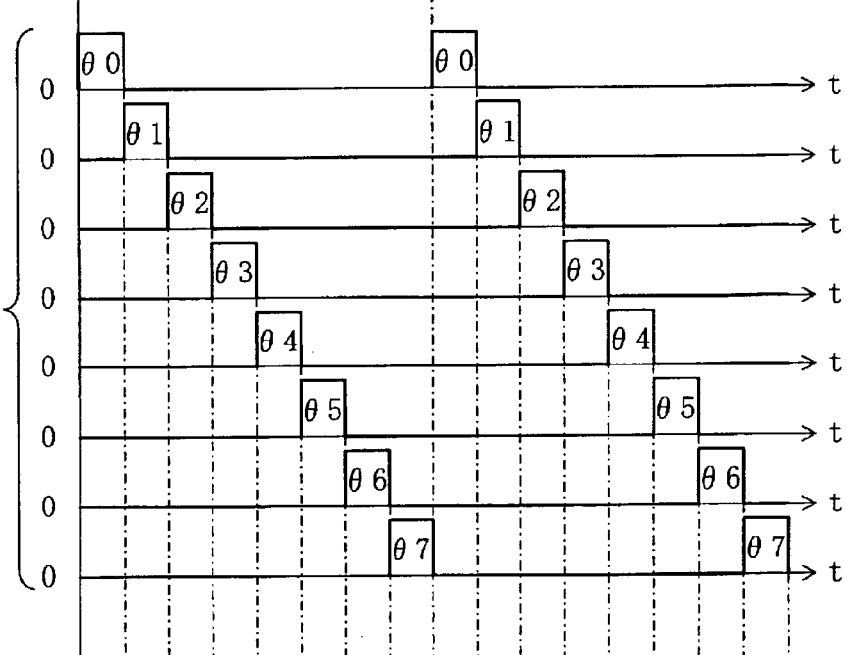
Figure 15C:
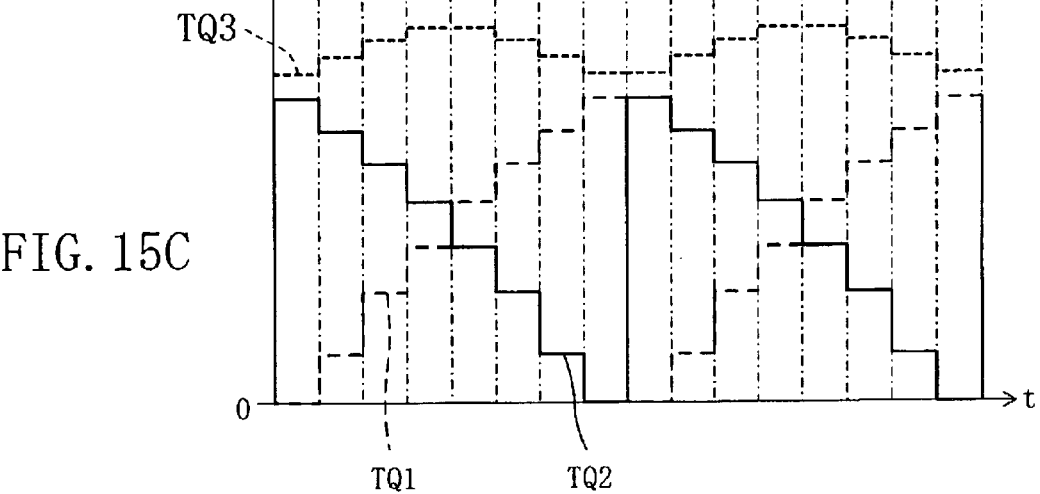

First, the block dividing section 81 receives the Hall signals DT21, DT22 and DT23 and produces the divided signals DT811, DT812, DT813, DT814, DT815 and DT816 so that each divided signal has a period of 60 electrical degrees. Then, the block subdividing section 84 further divides each of the divided signals DT811, DT812, DT813, DT814, DT815 and DT816 into eight subdivided signals θ0, θ1, θ2, θ3, θ4, θ5, θ6 and θ7. FIG. 15A to FIG. 15C are timing charts selectively illustrating two of the divided signals, i.e., DT811 and DT812. FIG. 15A illustrates the divided signals DT811 and DT812. FIG. 15B illustrates subdivided signals θ0 to θ7 for the divided signal DT811 and those for the divided signal DT812.

Figure 16:
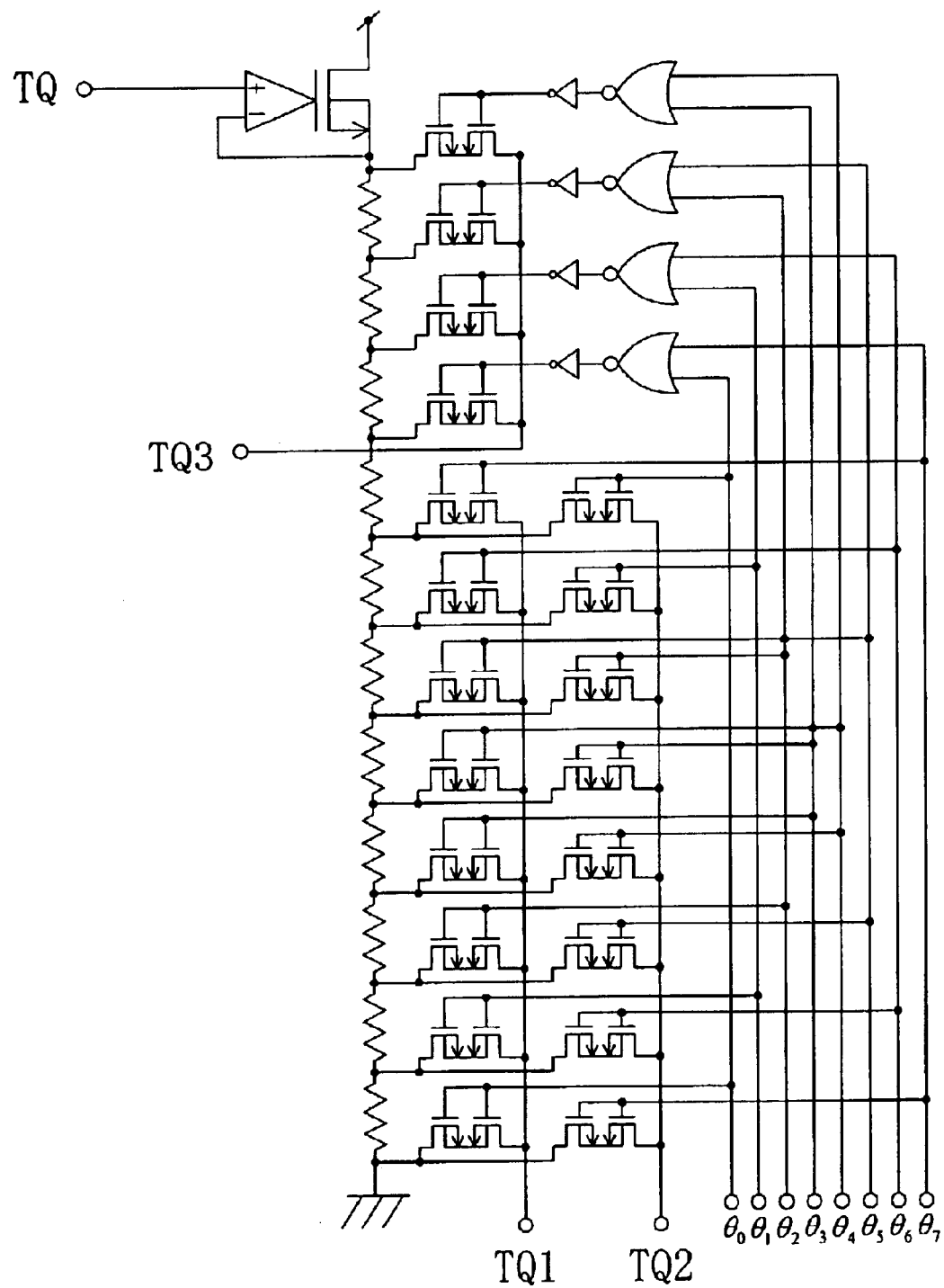
FIG. 16 is a circuit diagram illustrating a step wave generation section in the torque command signal generation section of FIG. 14.

FIG. 16 illustrates a circuit configuration of the step wave generation section 85. The step wave generation section 85 includes a plurality of resistors connected in series, an amplifier and a transistor for supplying a current through these resistors, switches for supplying different voltages to the resistors connected in series respectively for different subdivided signals θ0 to θ7 and logic circuits. The step wave generation section 85 receives the subdivided signals θ0 to θ7 and the torque command signal TQ to produce the increasing torque command signal TQ1, the decreasing torque command signal TQ2 and the total torque command signal TQ3 (FIG. 15C).

As described above, according to the present embodiment, it is possible to produce various torque command signals by varying the resistance ratio among the plurality of resistors connected in series in the step wave generation section 85.

Note that while the block subdividing section 84 subdivides each block divided signal into eight subdivided signals in the description above, it may alternatively subdivide each block divided signal into a larger number (e.g., 16, 32, . . . ) of subdivided signals. As the subdivision is finer, it is possible to, for example, produce various torque command signals each being a step wave that is closer to a sinusoidal wave. Moreover, while torque command signal generation section 8B receives Hall signals in the description above, the type of input signal is not limited to a Hall signal as long as the signal can indicate the rotor position. For example, the counter electromotive force of the motor coil may be used as the input signal in the case of a sensor-less motor.

Fourth Embodiment

A motor driving device according to the fourth embodiment of the present invention includes an oscillation section 5B that is different in configuration from the oscillation section 5A in the motor driving device of the first embodiment. Other than this, the configuration and the operation of the motor driving device are as those of the first embodiment, and thus will not be further described below. Various elements and signals used in the motor driving device of the present embodiment will be denoted by the same reference numerals as those used in FIG. 1.

Figure 17A:
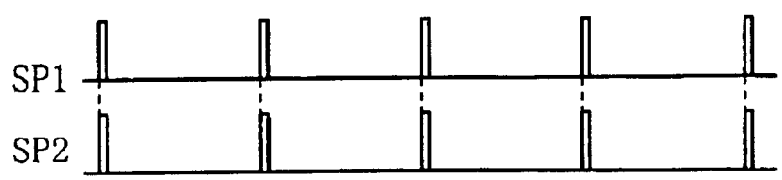
FIG. 17A to FIG. 17C are diagrams illustrating examples of set pulse signals used in the motor driving device according to the fourth embodiment of the present invention.
Figure 17B:
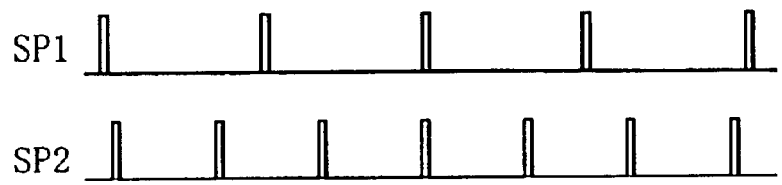
Figure 17C:
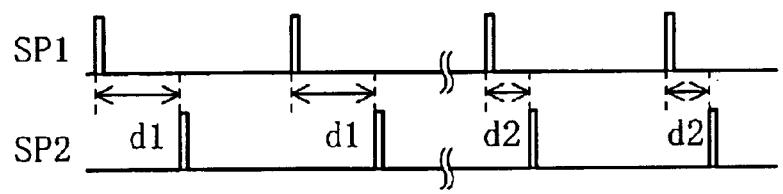

The oscillation section 5B produces set pulse signals SP1 and SP2 whose cycles are independent of each other. FIG. 17A to FIG. 17C illustrate some examples of the set pulse signals SP1 and SP2 produced by the oscillation section 5B. FIG. 17A illustrates an example where the set pulse signals SP1 and SP2 are the same. FIG. 17B illustrates an example where the set pulse signals SP1 and SP2 have frequencies different from each other.

FIG. 17C illustrates an example where the phase difference between the set pulse signals SP1 and SP2 changes according to the rotational speed of the motor. When the rotational speed of the motor is relatively lower, the phase difference is set to a relatively larger value d1, and when the rotational speed of the motor is relatively higher, the phase difference is set to a relatively smaller value d2. By using a relatively smaller phase difference during a relatively higher speed operation, it is possible to increase the period of time for which two phases are simultaneously energized with PWM control.

As described above, according to the present embodiment, it is possible to adjust the period of time for which two phases are simultaneously energized with PWM control, by changing the phase difference between the set pulse signals SP1 and SP2 according to the rotational speed of the motor, for example.

Fifth Embodiment

A motor driving device according to the fifth embodiment of the present invention includes a PWM control section 7B that is different in configuration from the PWM control section 7A in the motor driving device of the first embodiment. Other than this, the configuration and the operation of the motor driving device are as those of the first embodiment, and thus will not be further described below. Various elements and signals used in the motor driving device of the present embodiment will be denoted by the same reference numerals as those used in FIG. 1.

The PWM control section 7B turns ON the PWM control signal P1 (or P2) after the passage of a predetermined period from when it is turned OFF. An example of such an operation is illustrated in FIG. 18A to FIG. 18C, wherein FIG. 18A illustrates the set pulse signal SP1, FIG. 18B illustrates the PWM control signal PI, and FIG. 18C illustrates a count pulse signal CP. Note that the count pulse signal CP has a cycle that is sufficiently shorter than that of the set pulse signal SP1.

After the PWM control section 7B turns OFF the PWM control signal P1, the PWM control section 7B does not turn ON the PWM control signal P1 until a predetermined number of pulses of the count pulse signal CP are counted, thus providing a PWM OFF period of a constant length. After the predetermined number of pulses of the count pulse signal CP are counted, the PWM control signal PI is turned ON.

As described above, according to the present embodiment, the length of the PWM OFF period is kept constant, whereby it is possible to suppress variations in the rotation of the motor, which may occur when the PWM ON period is short, during a low-torque control operation, for example. Moreover, this further reduces the vibrations and noise of the motor.

Note that the PWM OFF period of the PWM control signal P1 does not need to be the same as that of the PWM control signal P2. For example, as illustrated in FIG. 19A and FIG. 19B, the PWM OFF period, d3, of the PWM control signal P1 may be different from the PWM OFF period, d4, of the PWM control signal P2.

Sixth Embodiment

Figure 20:
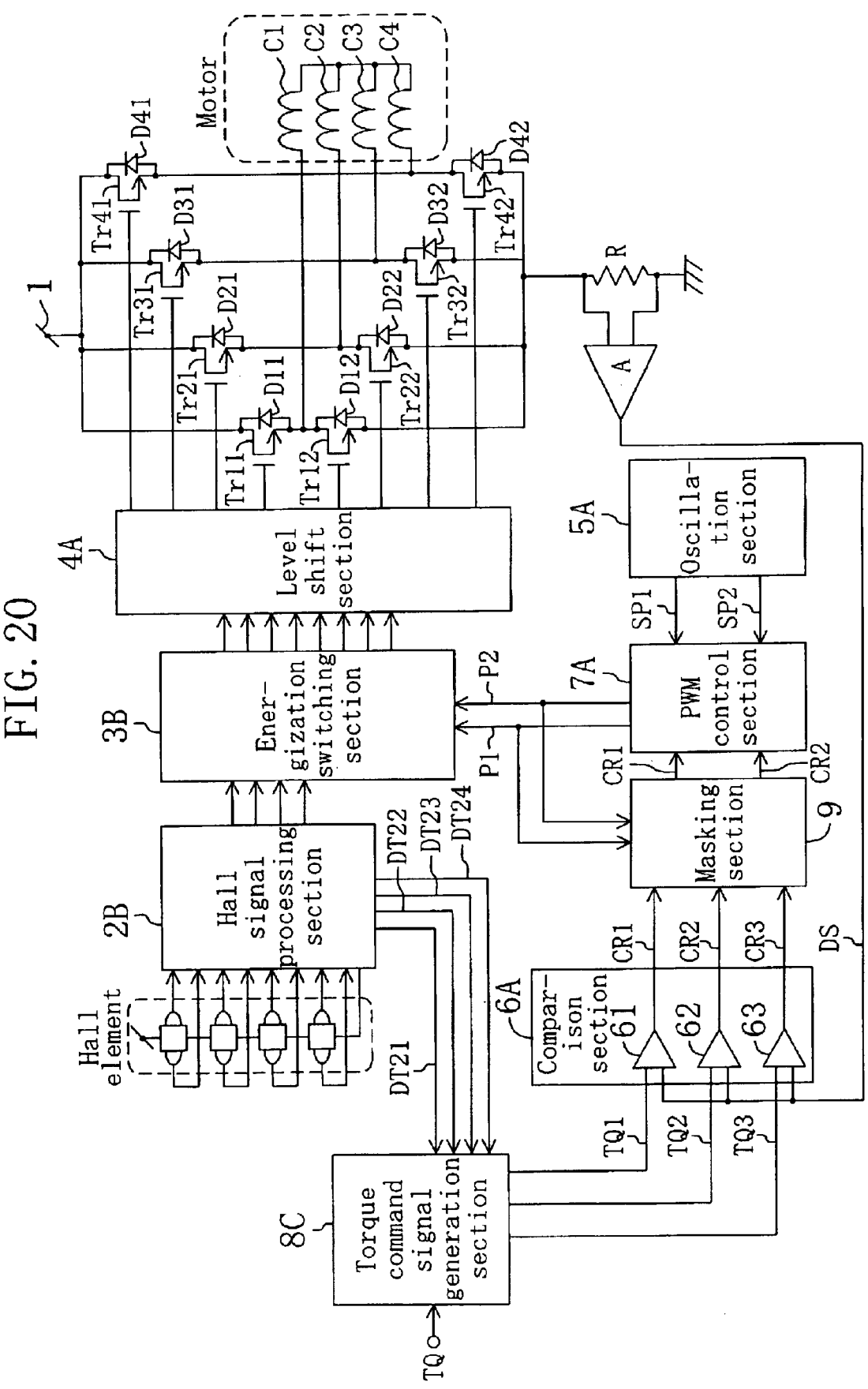
FIG. 20 is a diagram illustrating a configuration of the motor driving device according to the sixth embodiment of the present invention.

FIG. 20 illustrates a configuration of a motor driving device according to the sixth embodiment of the present invention. The motor driving device of the present embodiment drives a four-phase motor (having U phase, V phase, W phase and X phase) by energizing the motor coils with PWM control. The motor driving device includes the power supply 1 for driving the motor, a Hall signal processing section 2B, an energization switching section 3B, a level shift section 4A, the oscillation section 5A, the comparison section 6A, the PWM control section 7A, a torque command signal generation section 8C, the masking section 9, four half-bridge circuits connected in parallel to one another, the current detection resistor R, and the amplifier A for amplifying a voltage across the current detection resistor R.

The half-bridge circuit for controlling the energization of a motor coil C4 of the X phase includes a transistor Tr41 for controlling the application of a source current and a transistor Tr42 for controlling the application of a sink current. Diodes D41 and D42 are connected between the drain and the source of the transistors Tr41 and Tr42, respectively, each diode being connected in a direction that is opposite to the direction in which a current flows in response to an applied gate voltage. The U phase, the V phase and the W phase are as those of the first embodiment, and thus will not be further described below. Moreover, the oscillation section 5A, the comparison section 6A, the PWM control section 7A and the masking section 9 are as those of the first embodiment, and thus will not be further described below.

Figures 21A, 21B:
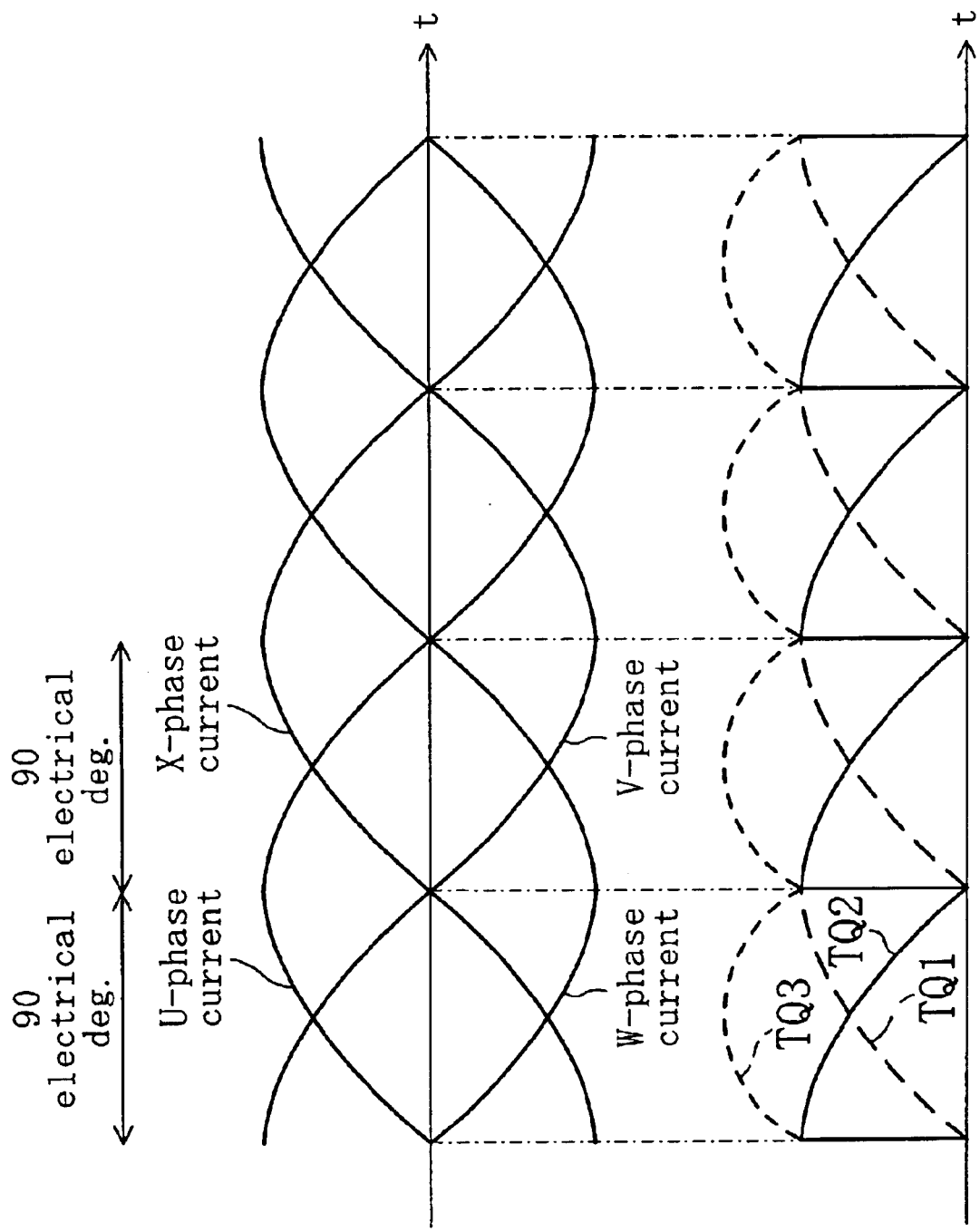
FIG. 21A and FIG. 21B are diagrams illustrating phase currents and various torque command signals used in the motor driving device according to the sixth embodiment of the present invention.
Figure 22:
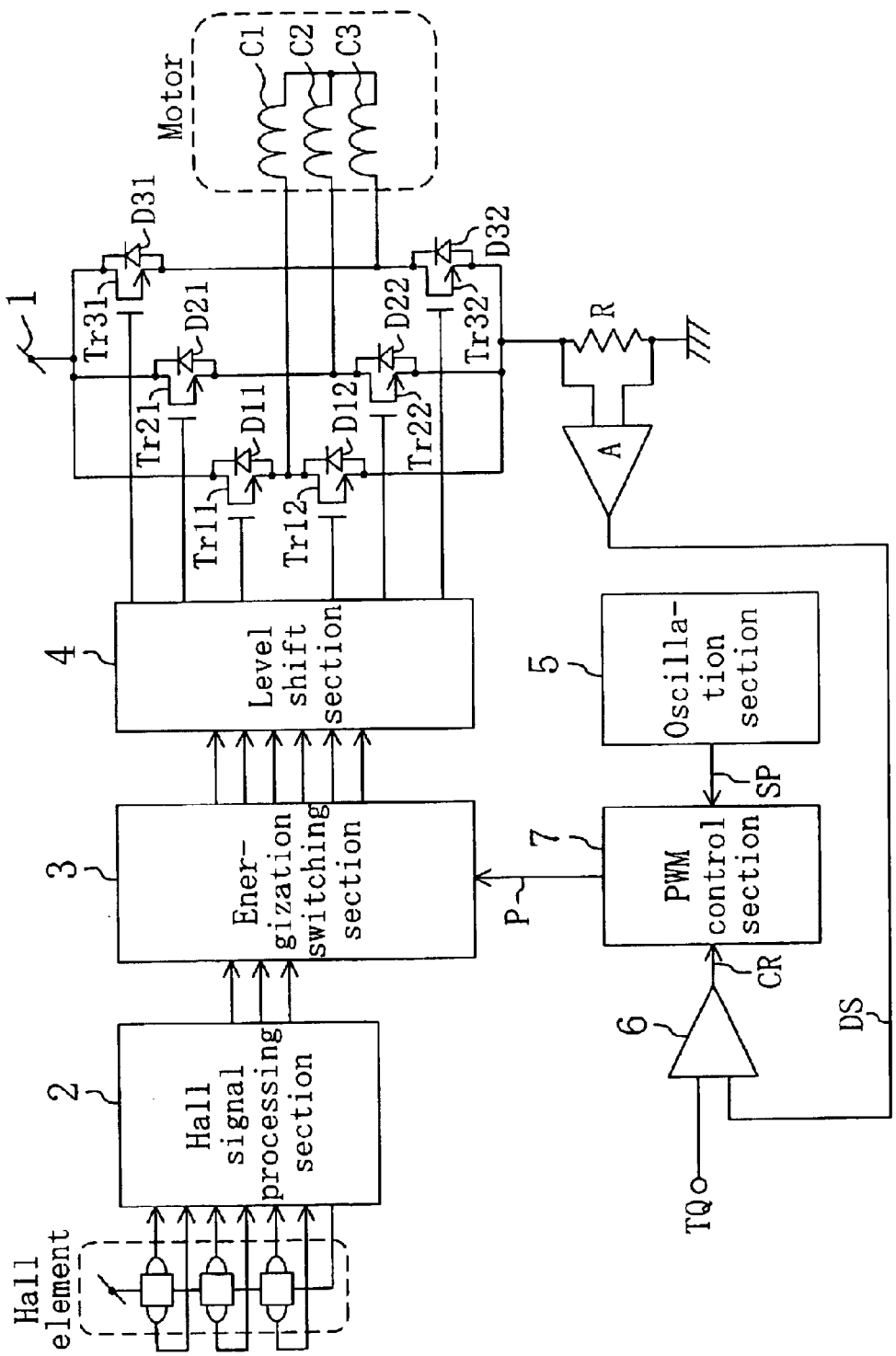
FIG. 22 is a diagram illustrating a configuration of a conventional motor driving device.
Figure 23A:
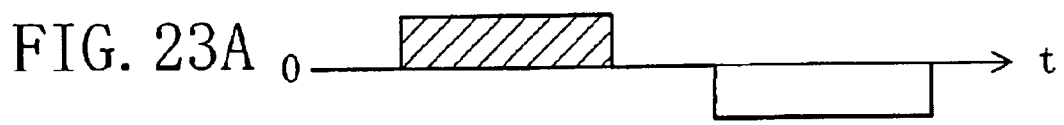
FIG. 23A to FIG. 23D are diagrams illustrating phase currents and a torque command signal used in the conventional motor driving device.
Figure 23B:
Figure 23C:
Figure 23D:
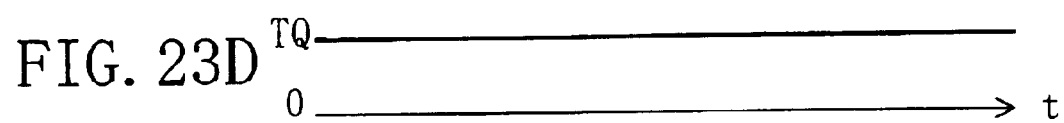

The Hall signal processing section 2B receives Hall signals from Hall elements to produce logical signals that indicate the rotor position. The energization switching section 3B receives the logical signals to determine phases to be energized. FIG. 21A illustrates a U-phase current, a V-phase current, a W-phase current and an X-phase current to be applied to energized phases, which are determined by the energization switching section 3B. In FIG. 21A, a portion above the time axis represents the application of the source current, and a portion below the time axis represents the application of the sink current.

FIG. 21B illustrates the increasing torque command signal TQ1 (corresponding to the "first torque command signal" of the present invention), the decreasing torque command signal TQ2 (corresponding to the "second torque command signal" of the present invention), and the total torque command signal TQ3 (corresponding to the "third torque command signal" of the present invention). Each of the torque command signals TQ1, TQ2 and TQ3 is a signal whose cycle has a period that corresponds to 90 electrical degrees in the cycle of the phase current, and is produced by the torque command signal generation section 8C. During a period of 90 electrical degrees, the increasing torque command signal TQ1 keeps increasing, whereas the decreasing torque command signal TQ2 keeps decreasing. The total torque command signal TQ3 is obtained by synthesizing the increasing torque command signal TQ1 with the decreasing torque command signal TQ2.

The four-phase motor is driven by performing PWM control for two pairs of phases, each pair of phases being shifted from each other by 180°. Referring to FIG. 21A, it is assumed that the U phase and the W phase are the first pair, and the V phase and the X phase are the second pair. Then, when the first pair is PWM-controlled at a current level according to the increasing torque command signal TQ1, the transistor Tr11 (or Tr12) for controlling the application of a source current (or a sink current) to the U phase and the transistor Tr32 (or Tr31) for controlling the application of a sink current (or a source current) to the W phase are switched simultaneously. Therefore, the four-phase motor driving operation is essentially the same as a two-phase motor driving operation.

In a block of 90 electrical degrees, the energization switching section 3B selects the first pair as the energized phases to be energized according to the increasing torque command signal TQ1 while selecting the second pair as the energized phases to be energized according to the decreasing torque command signal TQ2. Then, in the following block of 90 electrical degrees, the energization switching section 3B selects the second pair as the energized phases to be energized according to the increasing torque command signal TQ1 while selecting the first pair as the energized phases to be energized according to the decreasing torque command signal TQ2.

The level shift section 4A applies a gate voltage to the transistors of the four half-bridge circuits according to the signal from the energization switching section 3B.

The torque command signal generation section 8C receives the torque command signal TQ (corresponding to the "original torque command signal" of the present invention), and also receives Hall signals DT21, DT22, DT23 and DT24, whose waveforms have been shaped, from the Hall signal processing section 2B, to produce the increasing torque command signal TQ1, the decreasing torque command signal TQ2 and the total torque command signal TQ3, and output these torque command signals to the comparison section 6A. Note that the production of the various torque command signals is as that of the second embodiment, and thus will not be further described below.

PWM control performed in the motor driving device having such a configuration is as that of the first embodiment, and thus will not be further described below.

As described above, the present embodiment can be used for driving a four-phase motor as follows. Two pairs of phases that are selected as energized phases are energized with PWM control in parallel, whereby the phase currents can transition smoothly. In this way, it is possible to suppress vibrations of the motor and thus reduce noise from the motor. Moreover, since the transition from low-torque control to high-torque control is done smoothly, effects as those described above can be obtained for any torque.

Note that while the amplifier A is provided in the motor driving device described above, the amplifier A may alternatively be omitted, in which case the voltage across the current detection resistor R can be used directly as the current detection signal DS. Moreover, while the current detection resistor R is shown to be connected on the low-potential side, it may alternatively be connected at a position on the high-potential side, e.g., immediately after the power supply 1.

Moreover, while the comparison section 6A described above includes three comparators 61, 62 and 63, only one comparator may suffice if a torque command signal to be compared with the current detection signal DS is selected in synchronization with the PWM control signals P1 and P2.

Moreover, a regenerative current in the motor coil is described above to flow through a diode that is connected between the source and the drain of each transistor of the half-bridge circuits. Instead of providing the diode, a phase-inverted synchronization control may alternatively be performed for a transistor connected in series with the transistor that has been turned ON at a shifted timing so that a through current does not flow through the half-bridge circuit. In this way, it is possible to eliminate the voltage drop loss occurring when energizing the diode, and to reduce the power consumed by the motor driving device. Moreover, the transistor may be a power BJT, a power MOS, an IGBT, or the like.

Moreover, in the description above, Hall signals are received from Hall elements for detecting the rotor position. Instead of using Hall signals, the rotor position may be detected based on the counter electromotive force of the motor coil in the case of a sensor-less motor.

Moreover, even with a motor having more than four phases, two phases are energized with PWM control in parallel using the various torque command signals TQ1, TQ2 and TQ3 of the present invention, whereby phase current switching can be done smoothly. Thus, the present invention can provide a motor driving device for driving a motor having many phases with which it is possible to reduce the vibrations and noise of the motor.

As described above, according to the present invention, two phases that are selected as energized phases are energized with PWM control in parallel, whereby it is possible to prevent an abrupt phase current transition. Moreover, by the use of the trapezoidal-wave or sinusoidal-wave torque command signals, it is possible to energize a motor coil with a trapezoidal wave or a sinusoidal wave. In this way, it is possible to suppress vibrations of the motor and thus reduce noise from the motor.

What is claimed is:

1. A motor driving device for driving a motor by energizing motor coils with PWM control, the motor driving device comprising:

an energization switching section for determining a first energized phase and a second energized phase to be PWM-controlled, the determination being made at a predetermined cycle;

a torque command signal generation section that receives an original torque command signal for producing a first torque command signal and a second torque command signal each having an amplitude according to the original torque command signal;

a comparison section that receives the first and second torque command signals and a current detection signal, which is obtained by detecting a current being supplied to the motor, for comparing the current detection signal with the first and second torque command signals to output a first comparison result and a second comparison result, respectively;

an oscillation section for producing a first set pulse signal and a second set pulse signal; and a PWM control section that receives the first and second set pulse signals and the first and second comparison results for producing a first PWM control signal according to the first set pulse signal and the first comparison result and producing a second PWM control signal according to the second set pulse signal and the second comparison result, wherein the first and second energized phases, which are determined by the energization switching section, are energized with PWM control in parallel according respectively to the first and second PWM control signals, which are produced by the PWM control section.

2. The motor driving device of claim 1, wherein:

the torque command signal generation section produces a third torque command signal, which is obtained by synthesizing the first and second torque command signals together;

the comparison section compares the third torque command signal with the current detection signal to output a third comparison result; and the motor driving device further comprises a masking section that receives the first and second PWM control signals and the first, second and third comparison results for selectively masking or not masking the first and second comparison results according to the first and second PWM control signals and the third comparison result.

3. The motor driving device of claim 2, wherein the masking section masks the first and second comparison results during a period in which the first and second PWM control signals are both ON.

4. The motor driving device of claim 3, wherein upon detecting, from the third comparison result, that a level of the current detection signal has reached that of the third torque command signal during a period in which the first and second PWM control signals are both ON, the masking section unmasks one of the first and second comparison results while not unmasking the other comparison result for a predetermined period.

5. The motor driving device of claim 4, wherein:

during the predetermined cycle, the first torque command signal keeps increasing, whereas the second torque command signal keeps decreasing; and upon said detection, the masking section unmasks the second comparison result.

6. The motor driving device of claim 4, wherein:

during the predetermined cycle, the first torque command signal keeps increasing, whereas the second torque command signal keeps decreasing; and upon said detection, the masking section unmasks the first comparison result if said detection occurs in a first half of the predetermined cycle while unmasking the second comparison result if said detection occurs in a latter half of the predetermined cycle.

7. The motor driving device of claim 2, wherein the comparison section includes three comparators for comparing the current detection signal with the first, second and third torque command signals, respectively.

8. The motor driving device of claim 1, wherein:

the motor is a three-phase motor; and the energization switching section switches the first and second energized phases for every 60 electrical degrees in a cycle of a phase current applied to the motor coil of each phase in the motor.

9. The motor driving device of claim 8, wherein the torque command signal generation section receives a rotor detection signal for producing the first and second torque command signals each having a cycle that corresponds to a period of said electric angle in a cycle of the rotor detection signal.

10. The motor driving device of claim 8, wherein the torque command signal generation section receives a rotor detection signal for producing the first and second torque command signals by using divided signals that are obtained by dividing the rotor detection signal so that each divided signal has a period corresponding to said electric angle.

11. The motor driving device of claim 1, wherein:

the motor is a four-phase motor; and the energization switching section switches the first and second energized phases for every 90 electrical degrees in a cycle of a phase current applied to the motor coil of each phase in the motor.

12. The motor driving device of claim 11, wherein the torque command signal generation section receives a rotor detection signal for producing the first and second torque command signals each having a cycle that corresponds to a period of said electric angle in a cycle of the rotor detection signal.

13. The motor driving device of claim 11, wherein the torque command signal generation section receives a rotor detection signal for producing the first and second torque command signals by using divided signals that are obtained by dividing the rotor detection signal so that each divided signal has a period corresponding to said electric angle.

14. The motor driving device of claim 1, wherein the oscillation section produces the first and second set pulse signals whose cycles are independent of each other.

15. The motor driving device of claim 1, wherein the oscillation section produces the first and second set pulse signals so that a phase difference therebetween changes according to a rotational speed of the motor.

16. The motor driving device of claim 1, wherein the PWM control section turns ON the first PWM control signal according to the first set pulse signal and turns ON the second PWM control signal according to the second set pulse signal.

17. The motor driving device of claim 1, wherein the PWM control section turns OFF the first PWM control signal upon detecting, from the first comparison result, that a level of the current detection signal has reached that of the first torque command signal, and turns OFF the second PWM control signal upon detecting, from the second comparison result, that a level of the current detection signal has reached that of the second torque command signal.

18. The motor driving device of claim 1, wherein the PWM control section turns ON the first PWM control signal after passage of a predetermined period from a point in time when the first PWM control signal is turned OFF, and turns ON the second PWM control signal after passage of a predetermined period from a point in time when the second PWM control signal is turned OFF.

19. A motor driving method for driving a motor by energizing motor coils with PWM control, the motor driving method comprising:

an energization switching step of determining a first energized phase and a second energized phase to be PWM-controlled, the determination being made at a predetermined cycle;

a torque command signal generation step of producing a first torque command signal and a second torque command signal each having an amplitude according to a given original torque command signal;

a comparison step of comparing a current detection signal, which is obtained by detecting a current being supplied to the motor, with each of the first and second torque command signals; and a PWM control step of producing a first PWM control signal and a second PWM control signal according to a first set pulse signal, a second set pulse signal and comparison results from the comparison step, wherein the first and second energized phases, which are determined by the energization switching step, are energized with PWM control in parallel according respectively to the first and second PWM control signals, which are produced by the PWM control step.

20. The motor driving method of claim 19, wherein:

the torque command signal generation step produces a third torque command signal, which is obtained by synthesizing the first and second torque command signals together;

the comparison step compares the third torque command signal with the current detection signal; and the motor driving method further comprising a masking step of selectively masking or not masking the comparison results based on the first and second PWM control signals and the comparison result from the comparison step.

21. The motor driving method of claim 19, wherein:

the motor is a three-phase motor; and the energization switching step switches the first and second energized phases for every 60 electrical degrees in a cycle of a phase current applied to the motor coil of each phase in the motor.

22. The motor driving method of claim 19, wherein:

the motor is a four-phase motor; and the energization switching step switches the first and second energized phases for every 90 electrical degrees in a cycle of a phase current applied to the motor coil of each phase in the motor.

* * * * *

UNITED STATES PATENT AND TRADEMARK OFFICE
CERTIFICATE OF CORRECTION

PATENT NO. : 6,940,239 B2
DATED : September 6, 2005
INVENTOR(S) : Taishi Iwanaga et al.

It is certified that error appears in the above-identified patent and that said Letters Patent is hereby corrected as shown below:

Title page,
Item [56], References Cited, FOREIGN PATENT DOCUMENTS, add
-- JP 11-018474      1/1999
   JP 08-251964      9/1996
   JP 2000-050419    2/200 --; and change
"JP 2001 211680" to -- JP 2001-211680 --.

Signed and Sealed this

Fourteenth Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,940,239 B2  Page 1 of 1
DATED : September 6, 2005
INVENTOR(S) : Taishi Iwanaga et al.

It is certified that error appears in the above-identified patent and that said Letters Patent is hereby corrected as shown below:

<u>Title page,</u>
Item [56], References Cited, FOREIGN PATENT DOCUMENTS, add
-- JP 11-018474    1/1999
   JP 08-251964    9/1996
   JP 2000-050419  2/2000 --; and change
"JP 2001 211680" to -- JP 2001-211680 --.

This certificate supersedes Certificate of Correction issued February 14, 2006.

Signed and Sealed this

Second Day of May, 2006

JON W. DUDAS
*Director of the United States Patent and Trademark Office*